United States Patent
Stevens et al.

(10) Patent No.: US 11,165,821 B2
(45) Date of Patent: Nov. 2, 2021

(54) SYSTEM AND METHOD OF AUTHENTICATING THE SOURCE OF A COMMUNICATION SIGNAL TRANSMITTED ALONG A NETWORK BUS

(71) Applicant: Systems & Technology Research, LLC, Woburn, MA (US)

(72) Inventors: Mark Stevens, Bedford, MA (US); Gerard Titi, Ayer, MA (US); Nilanjan Dasgupta, Chelmsford, MA (US); Jeffrey Jackson, Salem, MA (US); Rurik Primiani, Somerville, MA (US); Nils Sandell, Somerville, MA (US)

(73) Assignee: SYSTEMS & TECHNOLOGY RESEARCH, LLC, Woburn, MA (US)

( * ) Notice: Subject to any disclaimer, the term of this patent is extended or adjusted under 35 U.S.C. 154(b) by 383 days.

(21) Appl. No.: 16/258,000

(22) Filed: Jan. 25, 2019

(65) Prior Publication Data

US 2019/0238587 A1    Aug. 1, 2019

Related U.S. Application Data

(60) Provisional application No. 62/622,856, filed on Jan. 27, 2018.

(51) Int. Cl.
*H04L 9/00*    (2006.01)
*H04L 29/06*    (2006.01)
(Continued)

(52) U.S. Cl.
CPC .......... *H04L 63/1483* (2013.01); *G01R 19/04* (2013.01); *G06F 21/55* (2013.01);
(Continued)

(58) Field of Classification Search
CPC ... H04L 63/16; H04L 63/126; H04L 63/1483; H04L 12/40; H04L 12/40136; G06F 21/55; G06F 21/85
See application file for complete search history.

(56) References Cited

U.S. PATENT DOCUMENTS

| | | | |
|---|---|---|---|
| 7,917,941 B2 * | 3/2011 | Wallman ............. | H04L 63/0846 726/4 |
| 2004/0107364 A1 * | 6/2004 | Shin .................. | H04L 29/12009 726/4 |

(Continued)

*Primary Examiner* — Beemnet W Dada
(74) *Attorney, Agent, or Firm* — Kriegsman & Kriegsman

(57) ABSTRACT

A communication network authenticates the source of messages transmitted on a flat bus to determine the presence of spoofing events. A programmable intrusion detection device is connected to the bus at a fixed location and compiles templates for various tri-bit signal pulses that form the data transmitted as messages between network nodes. Each tri-bit template compares unique signal characteristics inherent in the signal waveform received by the device from each node, the unique characteristics being directly attributable to the physical topology of the network. In use, the device uses the templates to calculate an inferred source identifier for each message. The inferred source identifier is then compared against the declared source identifier, which is embedded in message metadata, to authenticate the message source. Any lack of reconciliation between the inferred and declared source identifiers causes the device to mark the message as spoofed and initiate a designated response.

15 Claims, 14 Drawing Sheets

(51) Int. Cl.
*G01R 19/04* (2006.01)
*G06N 7/00* (2006.01)
*H04L 12/40* (2006.01)
*G06F 21/55* (2013.01)

(52) U.S. Cl.
CPC ............ *G06N 7/005* (2013.01); *H04L 12/40* (2013.01); *H04L 12/40136* (2013.01); *H04L 63/0876* (2013.01); *H04L 63/126* (2013.01); *H04L 63/16* (2013.01); *H04L 2463/146* (2013.01)

(56) References Cited

U.S. PATENT DOCUMENTS

| | | | | |
|---|---|---|---|---|
| 2005/0022020 A1* | 1/2005 | Fremberg | ............ | H04L 63/083 726/4 |
| 2006/0248229 A1* | 11/2006 | Saunderson | ........ | H04L 61/2015 709/245 |
| 2010/0146599 A1* | 6/2010 | Padmanabha | ......... | H04L 63/105 726/5 |
| 2020/0336906 A1* | 10/2020 | Belhareth | ........... | H04W 12/068 |

* cited by examiner

SYSTEM AND METHOD OF AUTHENTICATING THE SOURCE OF A COMMUNICATION SIGNAL TRANSMITTED ALONG A NETWORK BUS

CROSS-REFERENCE TO RELATED APPLICATIONS

The present application claims the benefit under 35 U.S.C. 119(e) of U.S. Provisional Patent Application No. 62/622,856, filed Jan. 27, 2018, the disclosure of which is incorporated herein by reference.

FEDERALLY SPONSORED RESEARCH OR DEVELOPMENT

This invention was made with government support under contract number N68335-17-C-0116 awarded by Naval Air Warfare Center Aircraft Division. The government has certain rights in the invention.

FIELD OF THE INVENTION

The present invention relates generally to communication networks and, more particularly, to means for protecting against the unauthorized interference of data transmitted on communication networks.

BACKGROUND OF THE INVENTION

In a communication network, data is transmitted between a plurality of a network elements, commonly referred to as nodes, through an arrangement of data transmission components, such as network connectors and cables. To facilitate the transmission of data within a communication network, each node is typically assigned a network identifier (ID), or address. In this manner, proper delivery of communication data can be achieved between a source node and a receiving node using corresponding network identifiers.

The topology of a communication network relates to its structure, or design, and is commonly represented both physically and logically. Physical topology relates generally to the overall structural layout (i.e. geometric arrangement) of components within the network as well as to specific physical aspects thereof (e.g. device location, cable installation, distances between nodes, transmission rates, physical interconnections and the like). By comparison, logical topology relates to the specific regulation, or control, of data transmitted between the various components of the network (e.g. using network identifiers).

In FIG. 1, there is shown a simplified schematic representation of a communication network, or system, 11 that has been constructed using a flat bus topology. As can be seen, flat bus network 11 comprises a central network cable, or network bus, 13 to which a plurality of network elements, or nodes, 15-1 thru 15-6 is independently coupled via corresponding links, or connectors, 17-1 thru 17-6, respectively. In this manner, network bus 13 serves as the backbone through which communication signals are transmitted between various network elements 15.

To facilitate the connection of nodes 15 to network bus 13, a plurality of bus couplers 19-1 thru 19-6 is commonly connected inline to network bus 13. As such, node links 17-1 thru 17-6 connect to bus 13 via bus couplers 19-1 thru 19-6, respectively.

In use, system 11 transmits information using a message-based protocol that relies upon declared logical identifiers to facilitate transmission of a communication signal between nodes 15. In other words, the communication signal not only includes the intended communication information to be shared via bus 13 but also logical identifiers to ensure proper delivery of the communication data to the intended recipient.

Due to its relatively simple and inexpensive construction, the general design of flat bus network 11 has been, and continues to be, utilized in communication systems for various types of vehicles and industrial controls.

For instance, a MIL-STD 1553 network bus is a military standard that relates to a flat bus network design commonly utilized in aviation communication systems. Under this network standard, a military aircraft often contains several flat bus networks, with each network designed to transmit communication data between as many as 32 nodes. In use, each network is used to transmit various types of data among node devices, sensors and subsystems, including certain critical operational information (e.g. engine status, flight controls, radar detection, and the like).

As another example, a controller area network (CAN) bus is another network standard that relates to a flat bus network design commonly utilized in communication systems for various types of commercial and private road vehicles, such as automobiles, buses and light rail transit (LRT) cars. Used in this environment, a CAN bus typically allows for the exchange of data between various system microcontrollers, such those found in an engine control unit, transmission, airbags, power steering, and anti-lock braking system (ABS).

Although well-known and widely used in the art, it has been found that flat bus networks of the type as described above, are susceptible to both theoretical and applied cyber-attacks. Notably, flat bus networks as described above were originally designed as trusted networks, which allow for the free exchange of data between all nodes.

For instance, in FIG. 1, flat bus network 11, which is designed for compliance with the MIL-STD 1553 standard, is implemented with (i) a bus controller BC at node 15-1, the bus controller BC being responsible for regulating the communication of messages over network bus 13, (ii) a bus monitor BM at node 15-2, the bus monitor BM being responsible for recording messages transmitted over network bus 13, and (iii) terminal devices TD-1, TD-2 and TD-3 at nodes 15-3, 15-4 and 15-5, respectively. In this environment, each terminal device TD represents any network element that is responsible for performing a designated system-related task (e.g. a sensor, microcontroller, subsystem or the like).

However, in the present example, an unauthorized hardware device, or implant, IMP has been stealthily integrated into flat bus network 11 at node 15-6. By stealthily connecting unauthorized hardware device IMP to bus 13 (e.g. during routine maintenance or servicing of the aircraft during a period of nonuse), the operational integrity of the entire communication network 11 can be compromised. In particular, the insertion of unauthorized elements, such as implant IMP, into network 11 can be used to intentionally inject false communication signals.

In lieu of an implant device, an unscrupulous individual may otherwise engage in cyber-attacks by infecting an authorized terminal device (e.g. device TD-2) with malicious software. As such, a trusted terminal device can be used to intentionally transmit false communication signals.

In either scenario, communication network 11 is rendered susceptible to spoofing events. In such a spoofing attack, one node (e.g. node 15-6) masquerades as another node (e.g.

node 15-3) by using a falsified sender address (i.e. the logical ID of node 15-3). Due to its trusted design, network 11 does not typically authenticate, or otherwise verify, the source of transmitted messages. Consequently, for communication networks responsible for the transmission of data between critical systems of a vehicle, the injection of spoofed messages may affect proper vehicle operation, potentially with catastrophic implications.

Although newer flat bus network standards can be designed to detect and treat cyber-attacks, many existing flat bus networks, which operate under legacy standards (e.g. the MIL-STD 1553 standard), would require complete replacement in order to combat such attacks, which is highly cost-prohibitive. Because these vulnerable networks are prevalent in wide array of vehicles that are in active use, a significant risk of potentially harmful cyber-attacks remains.

SUMMARY OF THE INVENTION

It is an object of the present invention to provide a new and improved system and method for authenticating the source of data transmitted on a communication network.

It is another object of the present invention to provide a new and improved system and method for authenticating the source of data transmitted on a communication network that has been constructed using a flat bus topology.

It is yet another object of the present invention to provide a system and method as described above that effectively monitors and detects spoofing events on the communication network.

It is still another object of the present invention to provide a system and method as described above that can be adapted for use in legacy communication systems.

It is another object of the present invention to provide a system and method as described above that is simple in design, configurable for use in a wide variety of applications, and inexpensive to implement.

Accordingly, as a feature of the invention, there is provided a method for authenticating the source of a message transmitted on a communication network, the communication network comprising a flat network bus to which a plurality of nodes is coupled, each of the plurality of nodes being assigned a logical source identifier, the method comprising the steps of (a) calculating an inferred source identifier for the message by analyzing physical characteristics of the transmitted message, (b) extracting a declared source identifier from the transmitted message, and (c) comparing the inferred source identifier against the declared source identifier to determine whether the message is authentic.

As another feature of the invention, there is provided a communication network for authenticating the source of a message transmitted thereon, the communication network comprising (a) a flat network bus, and (b) a plurality of nodes coupled to the flat network bus, each of the plurality of nodes being assigned a logical source identifier, and (c) an intrusion detection device coupled to the flat network bus, wherein the intrusion detection device authenticates the source of the message by analyzing physical characteristics of the message.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings, wherein like reference numerals represent like parts:

FIG. 10(*b*) is a graphical representation which illustrates how the intrusion detection device in FIG. 7 identifies the presence of traffic on the network bus and extracts message boundaries;

DETAILED DESCRIPTION OF THE INVENTION

Communication System 111

Figure 1:
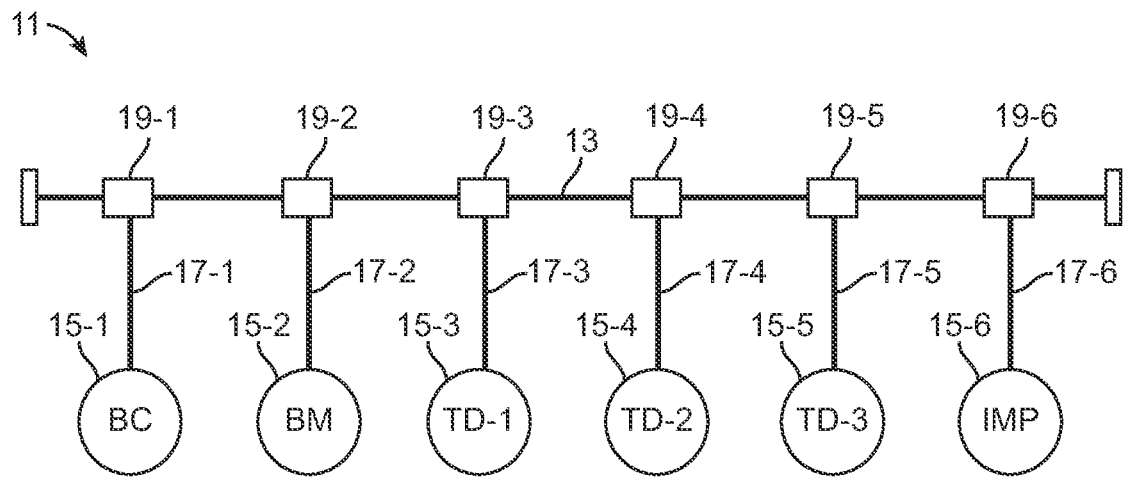
FIG. 1 is a simplified schematic representation of a prior art communication network that has been constructed using a flat bus topology.
Figure 2:
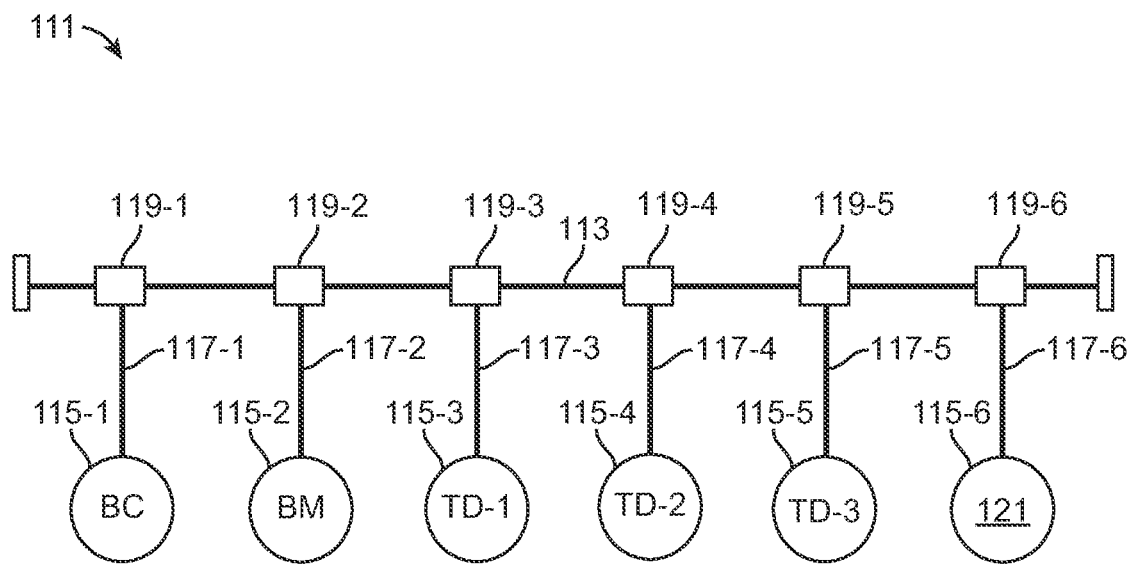
FIG. 2 is a simplified schematic representation of a first embodiment of a flat bus communication network constructed according to the teachings of the present invention.

Referring now to FIG. 2, there is shown a simplified schematic representation of a communication system constructed according to the teachings of the present invention, the system being defined generally by reference numeral 111. As will be explained in detail below, communication system 111, which is constructed using a flat bus topology, is specifically designed to authenticate the source of communication data transmitted thereon and, in turn, initiate an appropriate response upon detecting a spoofed message.

As can be seen, communication system, or network, 111 is similar to communication system 11 in that communication system 111 comprises a central network bus 113 to which a plurality of network elements, or nodes, 115-1 thru 115-6 is coupled via corresponding links, or connectors, 117-1 thru 117-6, respectively. To facilitate the connection of nodes 115 to network bus 113, a plurality of bus couplers 119-1 thru 119-6 is connected inline to network bus 113. As such, node links 117-1 thru 117-6 connect to bus 113 via bus couplers 119-1 thru 119-6, respectively.

As defined herein, network 111 represents any communication network with a flat bus topology. Accordingly, it is to be understood that the number and physical arrangement of nodes 115 in relation to network bus 113 could be modified without departing from the spirit of the present invention. It is also to be understood that network 111 could be modified, as needed, for compliance with a particular network standard.

In the present embodiment, network 111 is also similar to system 11 in that network 111 is implemented with (i) a bus controller BC at node 115-1, the bus controller BC being responsible for regulating the communication of messages over network bus 113, (ii) an optional bus monitor BM at node 115-2, the bus monitor BM being responsible for recording messages transmitted over network bus 113, and (iii) terminal devices TD-1, TD-2, and TD-3 at nodes 115-3, 115-4 and 115-5, respectively, each terminal device TD representing any network element that is responsible for performing a designated system-related task (e.g. a sensor, microcontroller, subsystem or the like).

However, it should be noted that the particular types of network elements shown at nodes 115 are provided for illustrative purposes. Accordingly, alternative types of network elements could be used in place thereof (e.g. based on the intended application and/or bus standard) without departing from the spirit of the present invention.

As a principal feature of the present invention, network 111 differs from network 11 in that network 111 comprises an intrusion detection device (IDD) 121 at node 115-6. As will be explained in detail below, device 121 is specifically designed to provide real-time source authentication monitoring of messages transmitted on bus 113 in order to detect spoofing events. In this capacity, the construction and operation of intrusion detection device 121 serve as principal novel features of the present invention.

As a critical aspect of the present invention, applicant has recognized that the unique physical topology of a bus network causes signals transmitted from each node 115 to include certain distinctive characteristics (i.e. fingerprints). As a result, device 121 is specifically programmed to compile information relating to these unique signal characteristics associated with each node 115 in system 111 in order to verify the source of messages transmitted along network bus 113. In this manner, device 121 is effectively able to detect spoofed messages sent on network bus 113 and, in turn, initiate a designated response.

Consequently, it is to be understood that intrusion detection device 121 could be attached at any location on bus 113, since the distinctive signal characteristics associated with each node 115 is topology specific. Therefore, in order to achieve the desired results, the present invention only requires that a single device 121 be incorporated into a designated communication network at any available location.

Intrusion Detection Device 121

As referenced above, intrusion detection device (IDD) 121 is designed to authenticate the source of messages transmitted along network bus 113. In this manner, device 121 can be used to detect spoofing events and, in turn, initiate a predefined response, which is a principal object of the present invention.

Figure 3:
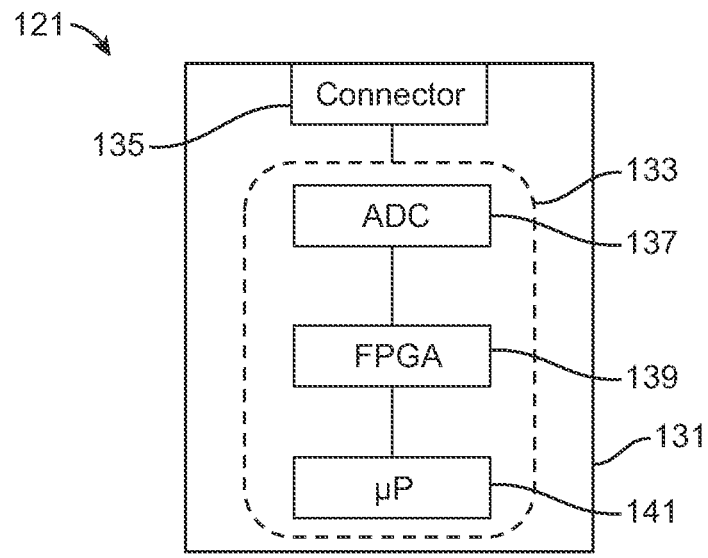
FIG. 3 is a simplified schematic representation of the intrusion detection device shown in FIG. 2.

Referring now to FIG. 3, a simplified schematic representation of IDD 121 is shown. As can be seen, intrusion detection device 121 is modular in construction and comprises an outer protective housing 131 in which electronics 133 are retained. A connection interface, or connector, 135 is mounted on housing 131 and is in electrical connection with electronics 133. Connector 135 is designed for releasable connection to a mating connector, such as directly to an available bus coupler 119, in order to transmit and receive signals on network bus 113.

Electronics 133 comprises an analog-to-digital converter (ADC) 137 in electronic communication with connector 135, a field-programmable gate array (FPGA) 139 in electronic communication with ADC 137, and a microcontroller 141 in electronic communication with FPGA 139.

As will be explained further in detail below, ADC 137 is responsible for converting analog signals transmitted on network bus 113 into digital form. In this manner, communication data transmitted on bus 113 can be processed, as needed, to detect spoofing events.

Field-programmable gate array (FPGA) 139 contains custom firmware that implements the novel application-specific algorithms which are used to detect spoofing events on network bus 113. Most notably, FPGA 139 is designed to, among other things, (i) infer, or calculate, the source ID (i.e. node) of a message based on its physical characteristics, (ii) compare the inferred source ID for that message against its declared source ID, and (iii) upon detecting any source inconsistencies, identify the message as spoofed.

Microprocessor 141 controls the principal states and modes of device 121. Through a direct connection interface (not shown), processor 141 may additionally provide means for, inter alia, (i) upgrading firmware on FPGA 139, (ii) permitting certain user control of device operations (e.g. operating modes), (iii) logging data for post-detection forensics, (iv) supporting communication with a computer to create a graphical user interface (GUI), and (v) outputting operational status and/or other related information, including the initiation of a designated response to a detected a spoofing event.

Due to its construction and programmed operation, it is envisioned that device 121 could be utilized in any flat bus network that requires message source authentication. As such, it is to be understood that device 121 could be readily integrated into communication systems, both legacy or new, that are commonly incorporated into various types of vehicles, such as military aircraft and light rail transit (LRT) cars, as well as industrial control systems. Most notably, device 121, as constructed herein, is compliant for integration within data bus systems of most standards, including the MIL-STD-1553 avionic data bus standard as well as the controller area network (CAN) vehicle data bus standard.

As will be described in detail below, device 121 exploits a unique and previously unforeseen attribute of communication signals transmitted along communication networks with a flat bus topology. Specifically, physical characteristics that are unique to each node device in a flat bus network produce slight, but perceivable, differences in transmitted signals. In other words, an identical message sent from each node 115 in system 111 would yield minor, yet measurable, differences in the signal received at a common location. In this manner, communication data transmitted along a flat network bus has unique attributes which effectively create a fingerprint that can be used to authenticate its source and thereby detect spoofed messages.

For example, physical attributes of the conductive path associated with each node 115 (e.g. the length/material of each link 117, the location of node 115 along network bus 113, and the like) create slight signal variances (e.g. signal degradation) that serve as unique markers for identifying the signal source. Stated another way, if the same tri-bit signal is sent from each of the various nodes 115 of bus network 111, differences in the physical properties of each associated signal path will create slight variances in the resultant waveform received at a common node. Accordingly, as will be described further in detail below, these unique signal attributes can be compared against the declared source ID (i.e. the node from which is signal reported to have been sent) to detect spoofed messages.

In FIG. 3, IDD 121 is represented as a modular, stand-alone device that is adapted to be releasably coupled to network bus 113 (e.g. through direct connection to any available coupler 119). However, it should be noted that device 122 need not be constructed as a modular hardware device. Rather, it is to be understood that the software which executes the novel intrusion detection process of the present invention could be installed into other components of network 111, thereby eliminating the need for a designated hardware implementation.

Figure 4:
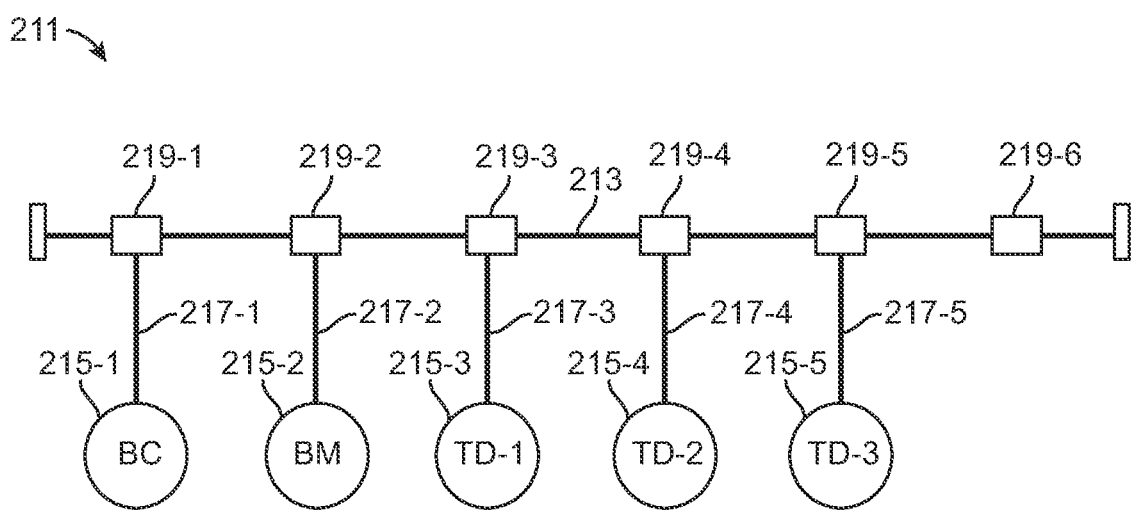
FIG. 4 is a simplified schematic representation of a second embodiment of a flat bus communication network constructed according to the teachings of the present invention.

For instance, in FIG. 4, a modified bus network 211 is shown. As can be seen, bus network 211 is similar to network 111 in that network 211 comprises a central network bus 213 to which a plurality of network elements, or nodes, 215-1 thru 215-5 is coupled via corresponding links, or connectors, 217-1 thru 217-5, respectively. Further, to facilitate the connection of nodes 215 to network bus 213, a plurality of bus couplers 219-1 thru 219-6 is connected inline to network bus 213. As represented herein, node links 217-1 thru 217-5 connect to bus 213 via bus couplers 219-1 thru 219-5, respectively.

However, network 211 differs from network 111 in that the principal intrusion detection software implemented in hardware device 121 is directly integrated into the electronics of bus coupler 219-6. In this manner, network 211 is provided with intrusion detection capabilities without the need for a standalone hardware device.

Intrusion Detection Process 311

Figure 5:
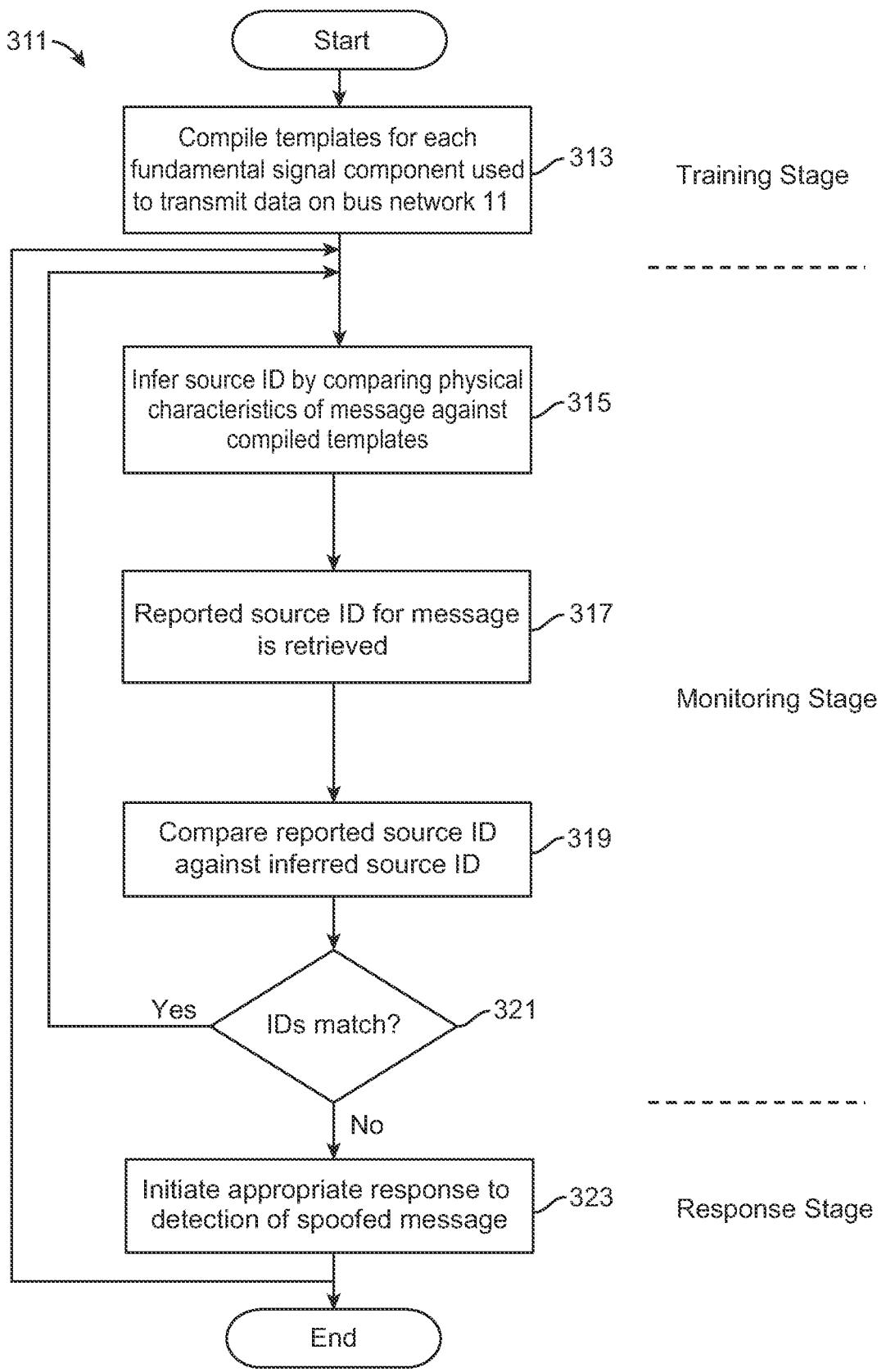
FIG. 5 is a flow chart depicting a novel method in which the intrusion detection device shown in FIG. 2 monitors and detects the presence of spoofing events on the network bus.

As noted above, IDD 121 is uniquely designed to detect the presence of spoofed messages transmitted on network bus 113. In the description that follows, a detailed explanation is provided of how IDD 121 monitors data on network bus 113 and detects the presence of spoofing events, the spoofing detection process being shown in FIG. 5 and identified generally by reference numeral 311.

As will be explained in greater detail below, spoofing, or intrusion, detection process 311 relies upon three principal stages: (i) a training stage, (ii) a monitoring stage, and (iii) a response stage.

As part of the training stage, IDD 121 compiles, or learns, a set of templates for each fundamental pulse used in communication network 111 to construct messages. For instance, in a communication network designed to transmit messages in Manchester coded waveforms, every message can be split, or reduced, into a unique arrangement, or sequence, of eight fundamental signal pulses (tri-bit patterns). Therefore, over time, as the same fundamental signal pulses are transmitted from the various nodes of network 111, IDD 121 generates a signal comparison template of the waveforms generated from each node for each fundamental signal pulse (tri-bit pattern).

As noted previously, the physical topology of network 111 causes each node 115 to inherently transmit the same fundamental pulse with certain unique signal characteristics, or markings. Accordingly, the template compiled for each pulse type illustrates the unique signal characteristics attributable to each node 115 on network 111 (e.g. measurable differences in the peak-to-peak voltage for a common signal pulse sent from different nodes).

Upon completion of the training stage, process 311 advances to a monitoring stage in which IDD 121 utilizes the learned templates compiled during step 313 to authenticate the source of all subsequent messages transmitted on network bus 113. Through a series of signal processing algorithms, which will be explained in greater detail below, IDD 121 first infers the source ID for each message transmitted on bus 113 by comparing the unique signal characteristics of its pulses against the previously compiled templates, this source ID inferring step being represented generally by reference numeral 315. Then, in step 317, the reported, or declared, source ID is retrieved by IDD 121. Thereafter, in step 319, IDD 121 compares the inferred source ID for the message, which was obtained in step 315, against the reported source ID for the message, which was retrieved in step 317.

Finally, in step 321, IDD 121 determines whether the inferred source ID reconciles with the declared source ID. If the inferred and declared source IDs match, process 311 returns to step 315 and the next successive message transmitted on bus 113 is evaluated for authenticity. However, if the inferred and declared source IDs do not match, a spoofing event is flagged by IDD 121 and process 311 advances to the response stage.

In step 323 of the response stage, IDD 121 is designed to initiate a predefined response upon the detection of a spoofed message. As can be appreciated, the designated response initiated in step 323 could take multiple forms. Examples of some possible responses include, but are not limited to, (i) suppression or correction of the spoofed message, (ii) temporary suspension of data transmission on bus 113, and/or (iii) activating an intrusion alert or other similar indicator (e.g. to a device in direct or wireless connection therewith). Depending on the concept of operations (CONOPS), method 311 may return to step 315 and continue evaluating subsequent messages on bus 113.

Although not represented herein, it is to be understood that method 311 may, at any time, return back to training stage from monitoring stage. For instance, if the physical topology of network 111 changes in any manner and/or if the placement of certain network devices is modified, a new set of signal templates would be required to ensure effective monitoring.

Figure 6:
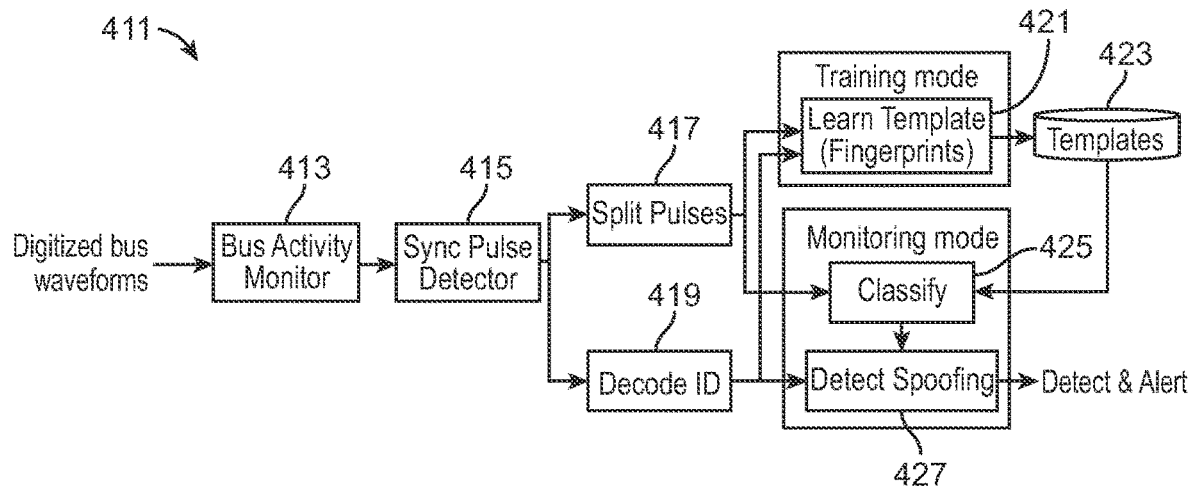
FIG. 6 is a system flow diagram that illustrates the signal processing algorithms applied by the intrusion detection device in FIG. 2 to monitor and detect the presence of spoofing events on the network bus.

A more detailed explanation of the signal processing algorithms applied by IDD 121 during the training and monitoring stages of process 311 is represented in a system flow diagram 411 provided in FIG. 6. As shown in diagram 411, the signal processing algorithms applied by IDD 121 are preferably programmed as a series of independent modules for ease of implementation.

As the first signal processing step, all data transmitted along network bus 113 is digitized by ADC 137. Thereafter, a bus activity module 413 programmed on FPGA 139 determines when there is activity, or traffic, on network bus 113. As such, module 413 acts as a trigger to subsequent processing steps that authenticate individual messages.

Upon detecting activity, a sync pulse detector 415 splits the raw message. Synch pulse detector 415 then identifies a synchronization pulse (e.g. a 3 us pulse) at the beginning of each message to perform a course alignment of the message for subsequent examination.

Once properly synchronized, a split pulses module 417 separates each message into a plurality of fundamental pulses. For instance, messages transmitted as Manchester coded pulse waveforms can be interpreted as a sequence of tri-bit pulses, where each pulse is labeled by the current bit, the preceding bit, and the following bit (i.e. resulting in a total of eight different pattern combinations—000, 001 011, 010, 100, 101, 110 and 111). Module 417 is used to split each message into a corresponding set of fundamental signal components (e.g. tri-bit pulses). As will be explained in detail below, representing each message in terms of a set of core pulses (e.g. eight different tri-bit waveforms) facilitates the message authentication process.

At the same time, a decode ID module 419 converts each pulse in the properly aligned message into corresponding binary values, which are in turn stored in registers. In this manner, module 419 is able to extract the declared source ID (i.e. the reported node from which the message is sent), as well as any other relevant metadata, from each aligned message.

During the training stage, or mode, a learn template module 421 compiles a complete set of the core pulse waveforms, each of which is cross-referenced with its declared source ID. Over time, each core pulse waveform (e.g. the eight core waveforms used when signals are transmitted as Manchester coded pulses) is preferably sent multiple times from every node 115 of network 111. Accordingly, module 421 is able to construct, or learn, accurate waveform templates by averaging each core waveform sent from a particular node 115.

Each template represents a particular core pulse waveform, as sent from each node 113 of network 111. Because of the unique physical topology of network 111, slight variances in the waveform associated with each declared node 113 will appear in each template. For example, a core waveform sent from node 115-1, which is the farthest physical distance from IDD 121 in network 111, will typically exhibit a slightly lower peak-to-peak voltage than the same core waveform sent from other nodes (e.g. node 115-5).

In this capacity, each template functions as a marking, or fingerprint, which is useful in authenticating the source of messages transmitted along network bus 113. Accordingly, the compiled templates are stored in a template database 423 for subsequent use during the monitoring stage.

Notably, during the monitoring stage, a classify module 425 receives from module 417 the set of individual pulses which constitute each message transmitted on network bus 113. In turn, classify module 425 compares the individual pulse waveforms for each message against the learned templates and engages in probabilistic modeling to calculate the source ID for the message, which is referred to herein as the inferred, or calculated, source ID.

For example, classify module 425 may generate a probability score for each pulse in a message by calculating the mean square error for each pulse against all compiled node waveforms in the appropriate template (e.g. by comparing the measured waveform for a 001 tri-bit pulse against the average waveforms compiled from each node 113 in the corresponding 001 tri-bit template). Through this technique, the node waveform with the highest degree of similarity to each evaluated pulse waveform is labeled as such. Using these node labels, each message is identified with an inferred source ID by voting or otherwise aggregating the score of the pulses comprising the message.

It should be noted that classify module 425 is not limited to any particular technique for computing the similarity scores used to label each pulse with a particular node. Rather, it is to be understood that alternative modeling techniques could be utilized by module 425 without departing from the spirit of the present invention. For instance, classify module 425 may alternatively compute similarity scores, for use in pulse labeling, by determining the Euclidean distance between the pulse data and each node waveform in the corresponding template and, in turn, accumulating the total Euclidean distance for the message.

A detect spoofing module 427 then compares the inferred source ID for each message, obtained from classify module 425, against its declared source ID, obtained from decode ID module 419, to detect spoofing events. In other words, upon detecting any mismatch between the inferred and declared source IDs for a message, module 427 deems the message spoofed and initiates an appropriate response, as part of the response stage.

Representative Test Results

The principles of the present invention were applied in a representative test system to determine its effectiveness in monitoring communications transmitted along a bus network and, in turn, detecting the presence of spoofed messages. The following example is provided for illustrative purposes only and is not intended to limit the scope of the present invention.

Figure 7:
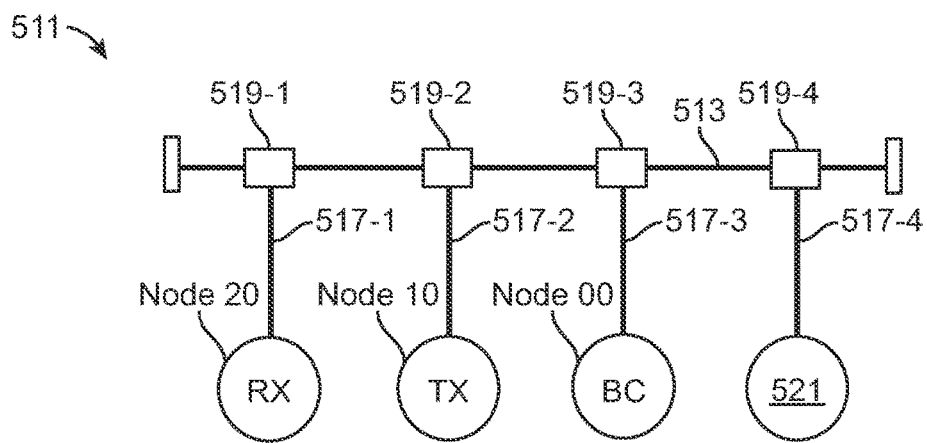
FIG. 7 is a simplified schematic representation of a specific implementation of the flat bus network shown in FIG. 2 which was utilized in actual testing.
Figure 8A:
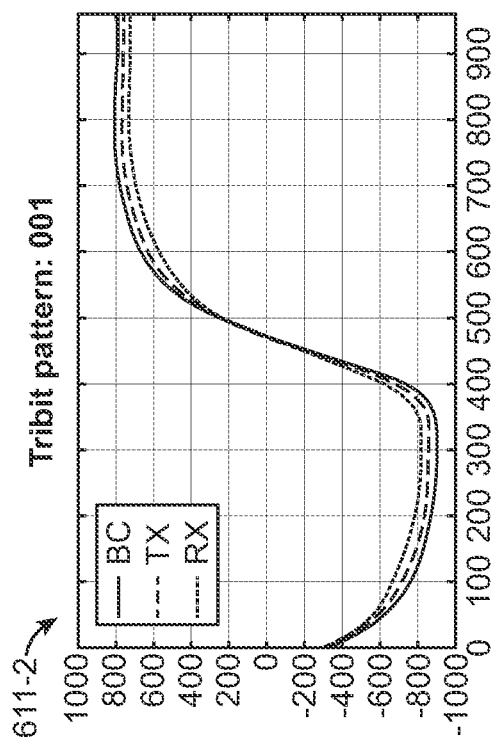
FIGS. 8(*a*)-(*h*) are a series of graphical representations of waveform templates generated using the test network shown in FIG. 7.
Figure 8B:
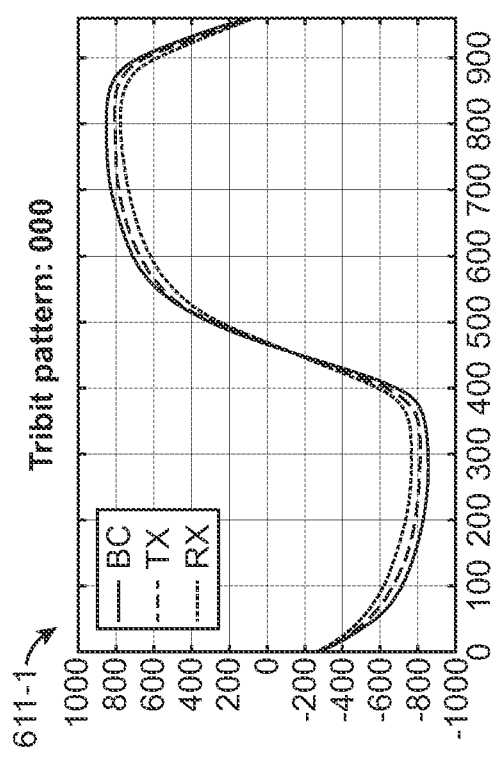
Figure 8C:
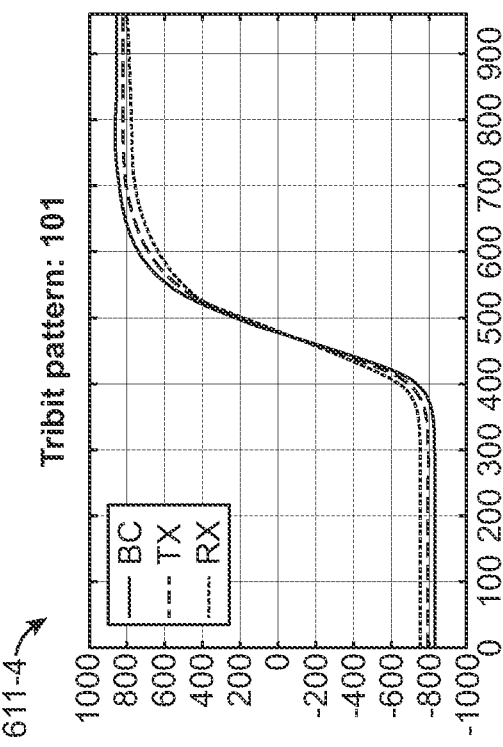
Figure 8D:
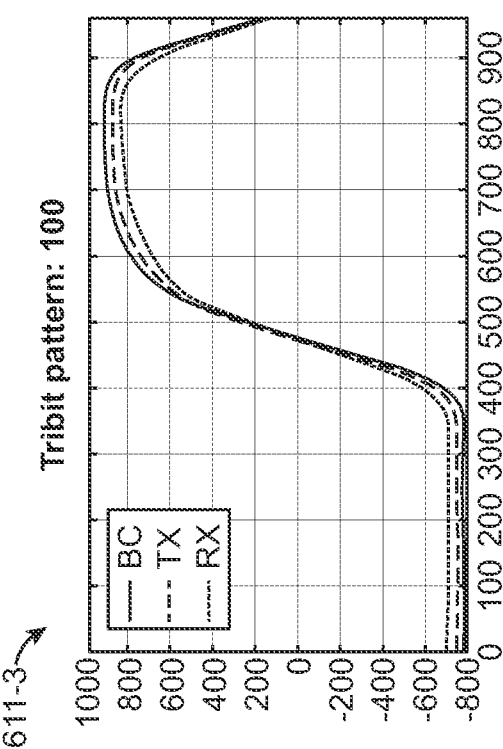
Figure 8E:
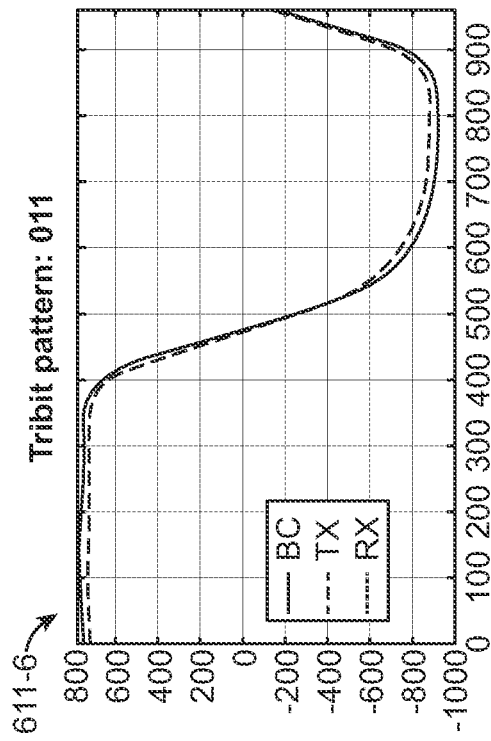
Figure 8F:
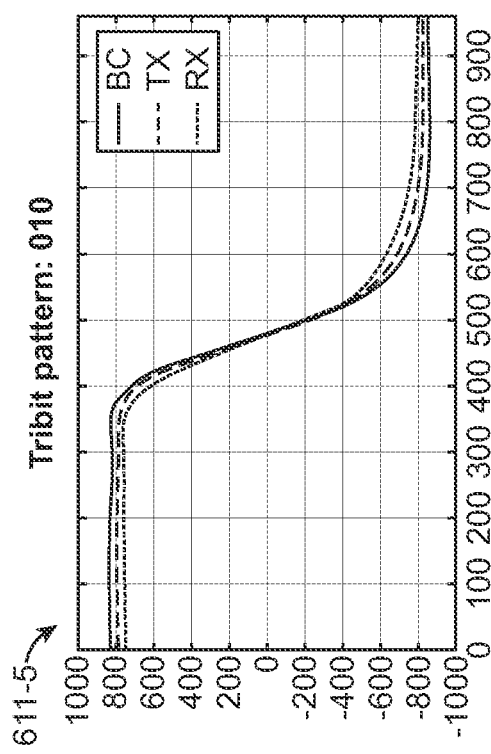
Figure 8G:
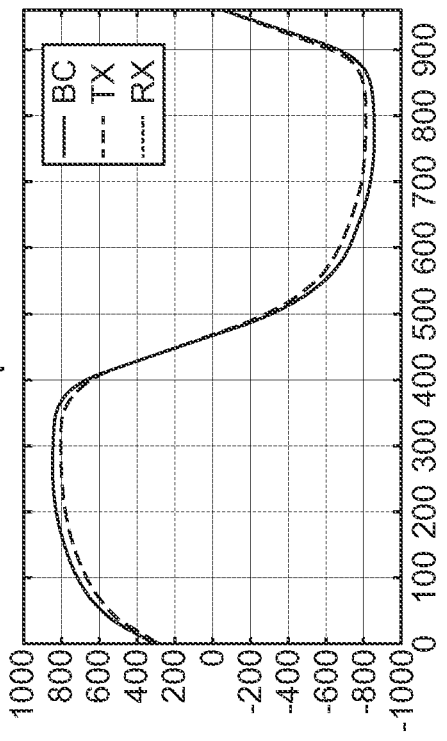
Figure 8H:
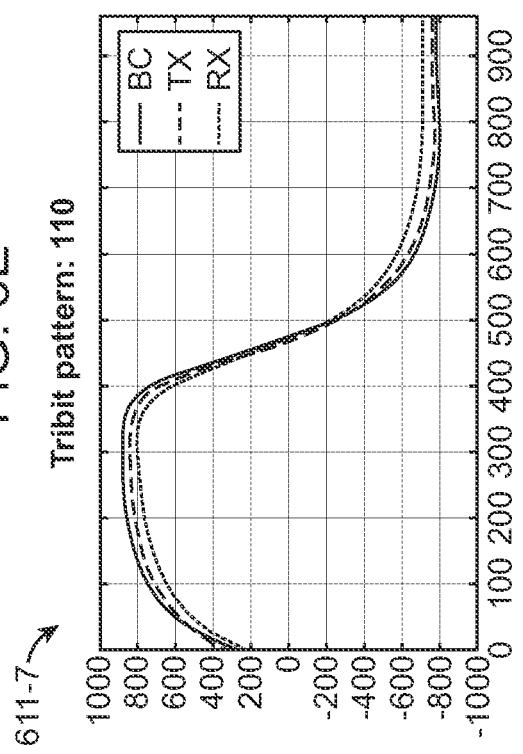

Referring now to FIG. 7, the details of the communication network utilized in the test system is shown, the network being identified generally by reference numeral 511. As can be seen, test system, or network, 511 is similar to system 111 in that system 511 comprises a network bus 513 to which a plurality of links 517-1 thru 517-4 is connected via bus couplers 519-1 thru 519-4, respectively.

In the present example, a network element representing a message receiving device RX is coupled to the terminal end of link 517-1, which is identified herein as node 20. A network element representing a message transmitting device TX is coupled to the terminal end of link 517-2, which is identified herein as node 10. Additionally, a network element representing a bus controller BC is coupled to the terminal end of link 517-3, which is identified herein as node 00.

Furthermore, an assembly of electronic components, which together form the basic functional construction of IDD 121, is coupled to the terminal end of link 517-4 and is represented herein generally as an intrusion detection device (IDD) 521. As will be shown in detail below, intrusion detection device 521 is specifically programmed to execute intrusion detection process 311 and thereby identify the presence of any spoofed messages transmitted along network bus 513.

As such, test system 511 is implemented herein as a four-node network. However, it should be noted that system 511 is limited herein to a four-node construction for simplicity purposes only. Rather, it is to be understood that system 511 could support a greater number of nodes (e.g. up to 32 nodes) without departing from the spirit of the present invention.

In the illustrative communication channel, information is transmitted as Manchester code waveforms. The shape of the analog waveform for a single pulse/bit (e.g., bit 0 or 1) depends not only on the digital content of the current bit (0/1), but also on the preceding and proceeding bit. Accordingly, as part of training step 313 of intrusion detection process 311, the eight, principal, tri-bit pattern combinations (i.e. patterns 000, 001, 100, 101, 010, 011, 110 and 111) are transmitted from each of devices RX, TX and BC. In response, intrusion detection device 521 receives and stores the signal transmitted from each of devices RX, TX and BC in connection with each tri-bit combination.

Referring now to FIGS. 8(a)-(h), there are shown a series of graphical representations, each of which serves as a characteristic signal template for each tri-bit combination. More specifically, each of FIGS. 8(a)-(h) includes a set of three waveforms which corresponds to an actual analog signal received by IDD 521 that was generated from each of devices RX, TX and BC for the designated tri-bit combination.

As a feature of the present invention, applicant has identified that, although the analog signal transmitted from each of RX, TX and BC for each tri-bit combination has the same general waveform, slight yet identifiable variances in the collected waveforms are the result of, inter alia, the node location of the signal source (i.e. whether from device RX, TX or BC) within the greater network bus topology. As can be appreciated, these unique, identifiable, signal characteristics thereby effectively provide an identifier (i.e. a distinctive signature or fingerprint) that can be exploited to authenticate the source of a message transmitted along network bus 513.

Most notably, for each set of waveforms corresponding to a particular tri-bit pattern, there are noticeable differences in, inter alia, peak-to-peak voltage, rise time, fall time, overshooting, and under-shooting. In the present example, the unique signal characteristics, or variances, are largely the result of differences in the physical distance, or length, of signal travel from each node to IDD 521. In other words, in the present example, a greater degree of signal degradation can be directly correlated to a commensurate increase in signal travel distance. Accordingly, device RX, which is the farthest distance away from IDD 521 in bus network 511, experiences the greatest amount of peak-to-peak signal degradation. Whereas, device BC, which is the shortest distance away from IDD 521 in bus network 511, experiences the least amount of peak-to-peak signal degradation.

In this manner, the measured signal variances for each tri-bit combination create a template which can be used to authenticate the source ID of a communication signal. More specifically, in the present example, (i) the measured waveforms in FIG. 8(a) collectively represent an identification template 611-1 for tri-bit pattern 000, (ii) the measured waveforms in FIG. 8(b) collectively represent an identification template 611-2 for tri-bit pattern 001, (iii) the measured waveforms in FIG. 8(c) collectively represent an identification template 611-3 for tri-bit pattern 100, (iv) the measured waveforms in FIG. 8(d) collectively represent an identification template 611-4 for tri-bit pattern 101, (v) the measured waveforms in FIG. 8(e) collectively represent an identification template 611-5 for tri-bit pattern 010, (vi) the measured waveforms in FIG. 8(f) collectively represent an identification template 611-6 for tri-bit pattern 011, (vii) the measured waveforms in FIG. 8(g) collectively represent an identification template 611-7 for tri-bit pattern 110, and (viii) the measured waveforms in FIG. 8(h) collectively represent an identification template 611-8 for tri-bit pattern 111.

It should be noted that, in test system 511, tri-bit combinations 011 and 111 were not utilized in the sample communication data transmitted from device RX and, as such, are not included in corresponding templates 611-6 and 611-8. However, it is to be understood that the absence of a tri-bit waveform from device RX in templates 611-6 and 611-8 was an artefact of the testing parameters. Namely, for simplicity purposes only, test system 511 was constructed with receiving device RX designed principally to receive messages. As a result, the testing parameters only required that receiving device RX transmit a limited amount of information (e.g. a message receipt status), which can be accomplished with a fixed bit pattern that does not require either of tri-bit patterns 011 and 111. However, ideally, IDD 521 would receive and store a characteristic waveform for each tri-bit pattern transmitted from every node on the communication network.

Once the learned template 611 for each tri-bit signal has been compiled, intrusion detection device 521 actively monitors test messages transmitted along network bus 511 for source authentication purposes. More specifically, IDD 521 cross-references the learned template 611 for each tri-bit signal against test messages transmitted along network bus 511 to authenticate, or verify, the declared source ID for each message. In this manner, IDD 521 is designed to detect a spoofing event within network 511 by flagging any messages with a declared source ID for a particular node that does not reconcile with the learned tri-bit signal characteristics associated with that node.

Referring now to FIGS. 9-14(c), there is shown a series of illustrative waveforms which are useful in understanding how IDD 511 applies intrusion detection process 311 to messages transmitted along network bus 513 of test system 511 in order to authenticate the reported source ID for each message.

Figure 9:
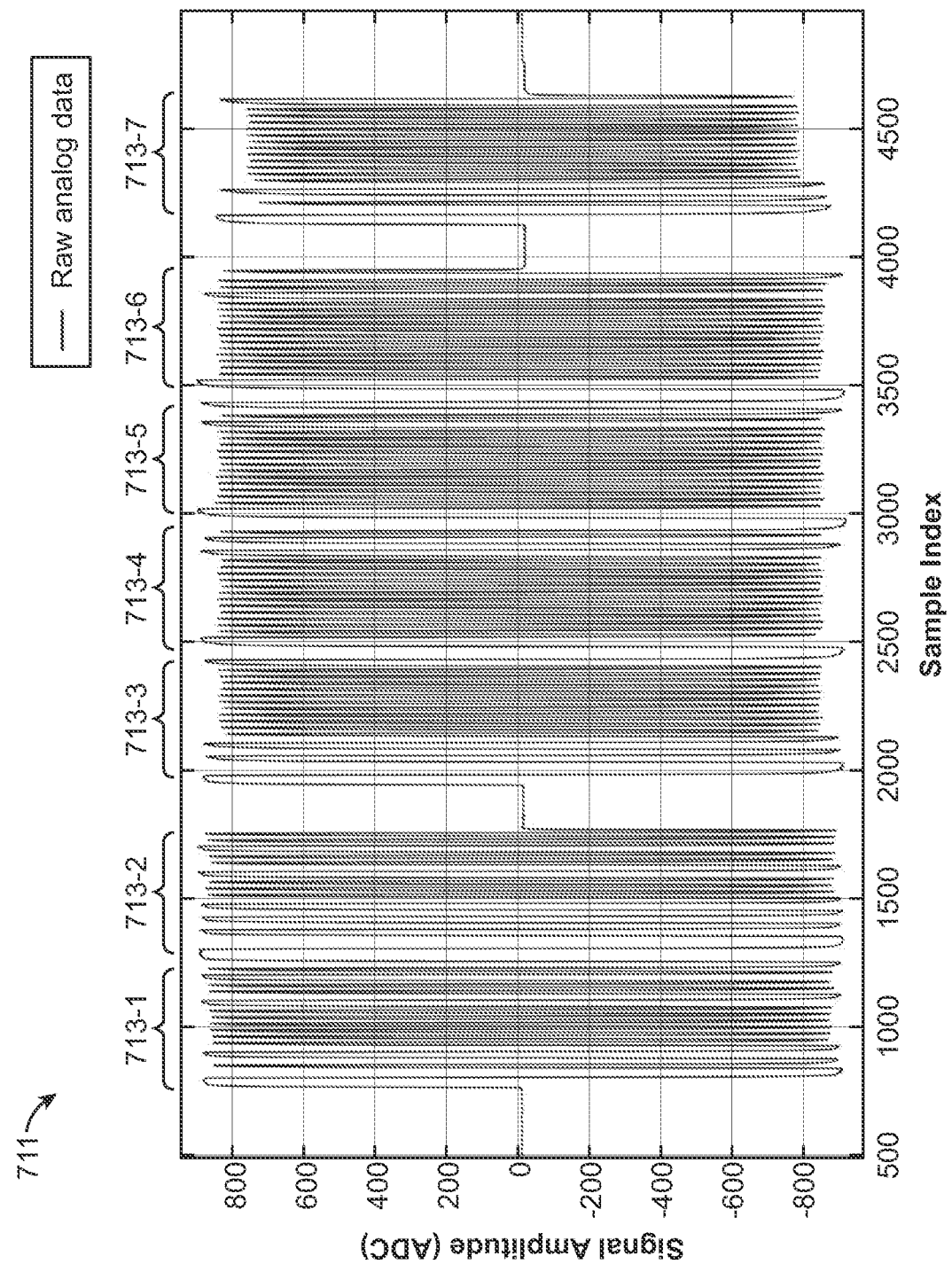
FIG. 9 is a graphical representation of an analog communication signal transmitted on the test network shown in FIG. 7.

In FIG. 9, there is shown an analog waveform 711 that represents a sample set (a message frame) of communication data transmitted along network bus 513. In the representative waveform 711, the data includes a series of words 713-1 thru 713-7, wherein each word 713 represents a fixed number, or size, of tri-bit signals (e.g. a set of 15 tri-bits). Together, words 713-1 and 713-2 constitute a primary message sent from device BC (e.g. instructing device TX to initiate a message to device RX relating to its operational status). Accordingly, words 713-3 thru 713-6 together constitute a secondary message sent from device TX in response thereto (e.g. current operational status of device TX). Lastly, word 713-7 constitutes the entirety of a tertiary message sent from device RX in response thereto (e.g. relating to receipt status of the message sent from device TX).

In order to authenticate the declared, or reported, source ID for each of the three aforementioned messages, IDD 521 first converts analog waveform 711 into digital form for subsequent processing. In the present example, intrusion detection device 521 samples and discretizes the raw analog data using a 12-bit analog-to-digital converter (ADC) to yield the digital waveform 811 represented in FIG. 10(a).

Figure 10A:
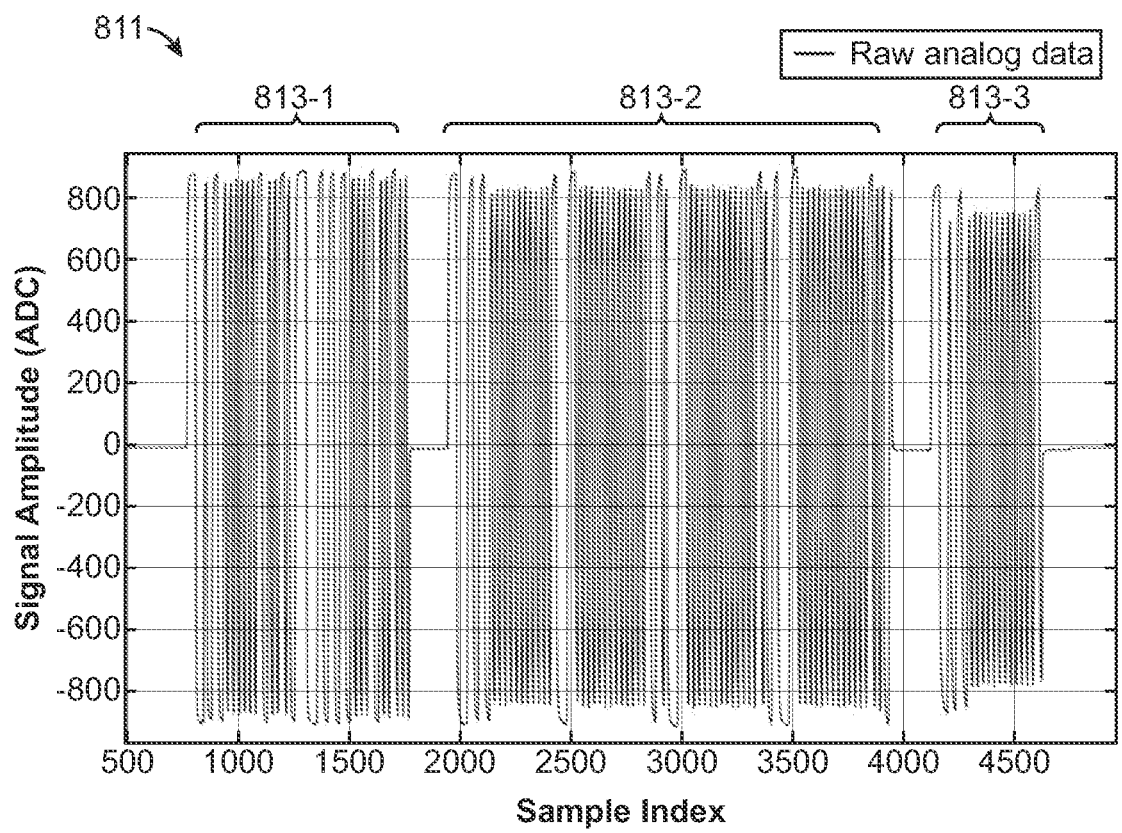
FIG. 10(*a*) is a graphical representation which illustrates how the intrusion detection device in FIG. 7 digitizes an analog waveform transmitted on the network bus.
Figure 10B:
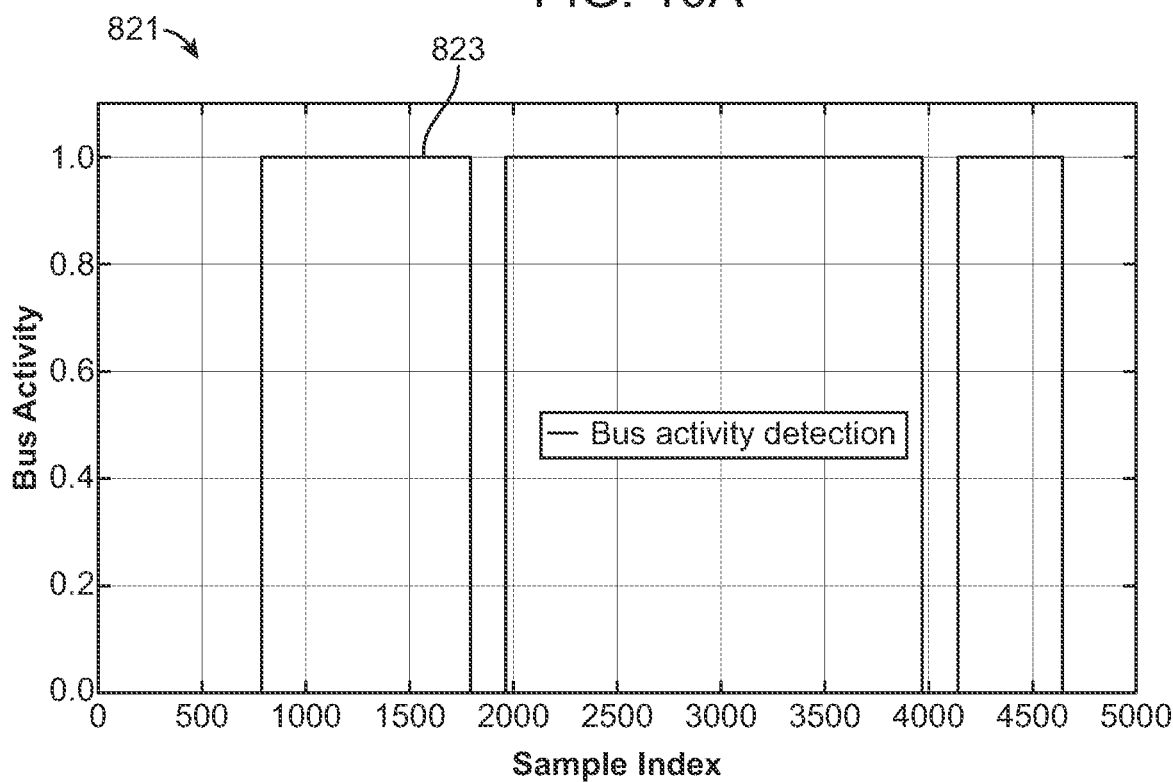

With all raw analog data transmitted on network bus 513 converted into digital form, IDD 521 analyzes digital waveform 811 to detect bus activity. Referring now to FIG. 10(b), a graphical representation 821 is shown which is used to indicate the presence of traffic on network bus 513. As can be seen, any bus activity in waveform 811 (e.g. associated with each of messages 813-1, 813-2, and 813-3) generates a corresponding binary flag 823 in FIG. 10(*b*) that is used by IDD 521 to identify bus activity. Therefore, module 413 is used to identify individual message boundaries and trigger downstream processing modules that authenticate messages.

Figure 11A:
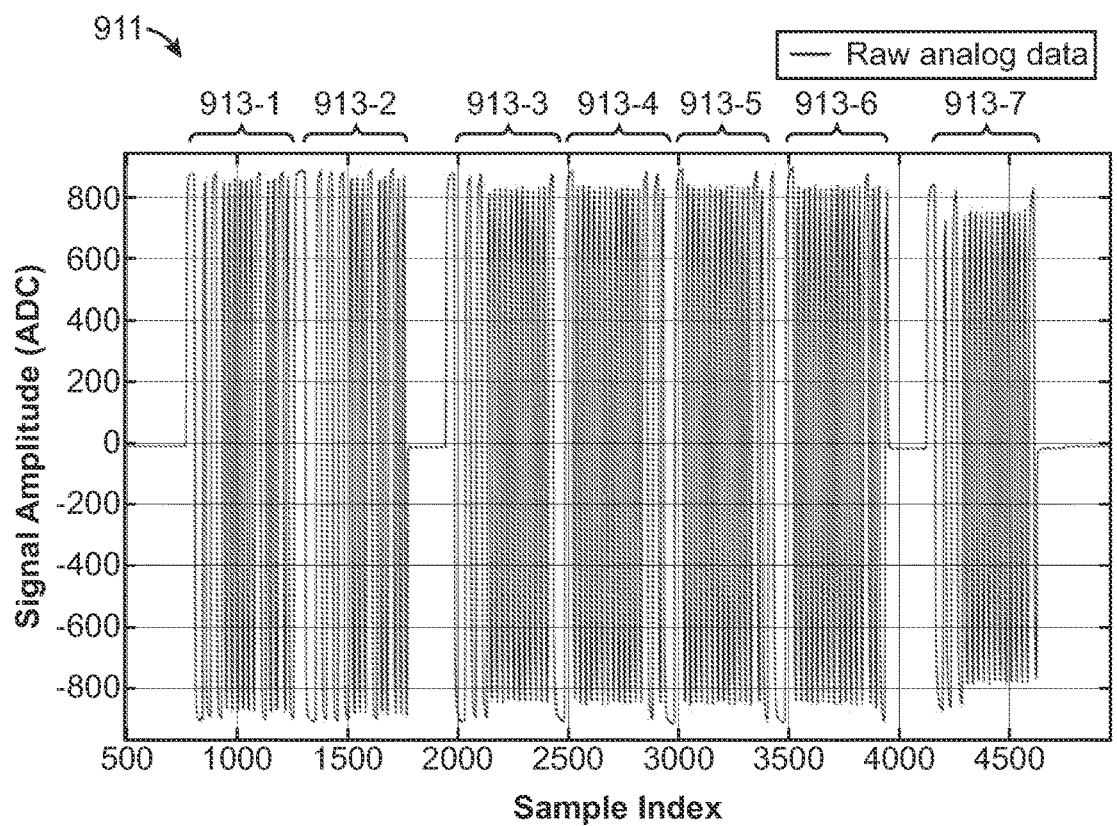
FIGS. 11(*a*) and 11(*b*) are graphical representations which together illustrate how the intrusion detection device in FIG. 7 synchronizes a digitized waveform for subsequent signal processing.
Figure 11B:
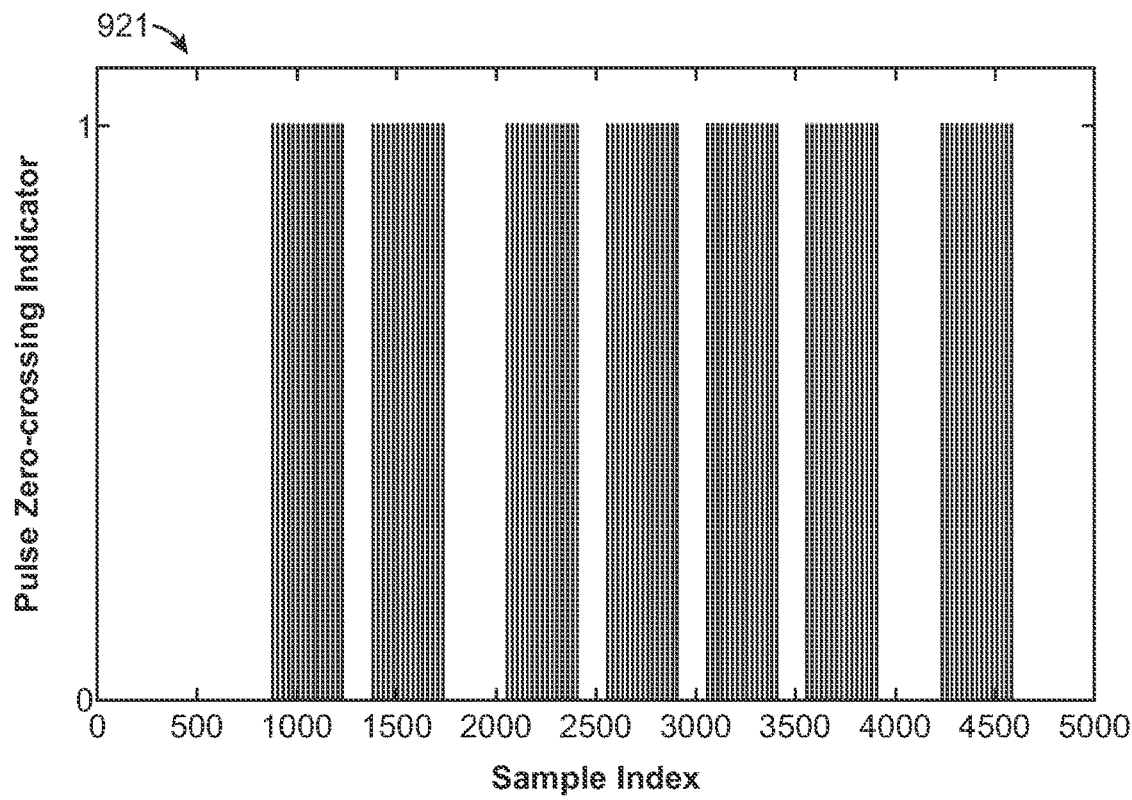

Once bus activity is identified, the communication data is then synchronized, or aligned, for subsequent processing. Specifically, in FIG. 11(*a*), the communication data, previously identified as bus activity, is represented as a digital waveform 911 comprised of words 913-1 thru 913-7. As seen in FIG. 11(*b*), a graphical representation 921 is shown that is useful in understanding how each word 913 of waveform 911 is aligned for subsequent processing.

Specifically, as digital waveform 911 in FIG. 11(*a*) crosses the mid-point, or zero-crossing, a commensurate pulse zero-crossing indicator is provided in graph 921 shown in FIG. 11(*b*). As can be appreciated, the mid-point is utilized herein for aligning each pulse in a message before comparing against trained templates.

Due to its fixed size, each word 913 in FIG. 11(*a*) is represented in graph 921 of FIG. 11(*b*) with an identical number of pulse indicators (15 pulse zero crossings are identified for each word of a message). In the present example, one pulse indicator is shown for each of the fifteen zero-crossing triggers occurring in each word 913.

Once properly synchronized, the bus data is preprocessed by IDD 521 for use in subsequent authentication analysis. Specifically, each indexed pulse is extracted from the transmitted message with any corresponding metadata, which is used in subsequent message authentication analysis. Consequently, upon completion, the resultant data bus information includes both (i) the message content, or payload, which is transmitted on bus 13 as a sequence of Manchester coded pulses (i.e. tri-bit patterns), and (ii) metadata, which includes control information relating to the message itself (e.g. source and destination addresses).

Among other things, the metadata attached to each pulse within a message includes: (i) pulse type (i.e. 0/1), (ii) pulse tri-bit pattern, (iii) pulse index and (iv) reported source ID (i.e. the declared ID of the node from which the message was sent). As will be explained further below, IDD 521 is then able to compare the declared source ID for each message pulse against the unique tri-bit signal characteristics previously compiled for each node. Therefore, any discrepancy detected between the declared source ID and the inferred source ID (as determined through probabilistic modeling against the learned templates) signifies the presence of a spoofed message, which is immediately identified by IDD 521.

Figure 12A:
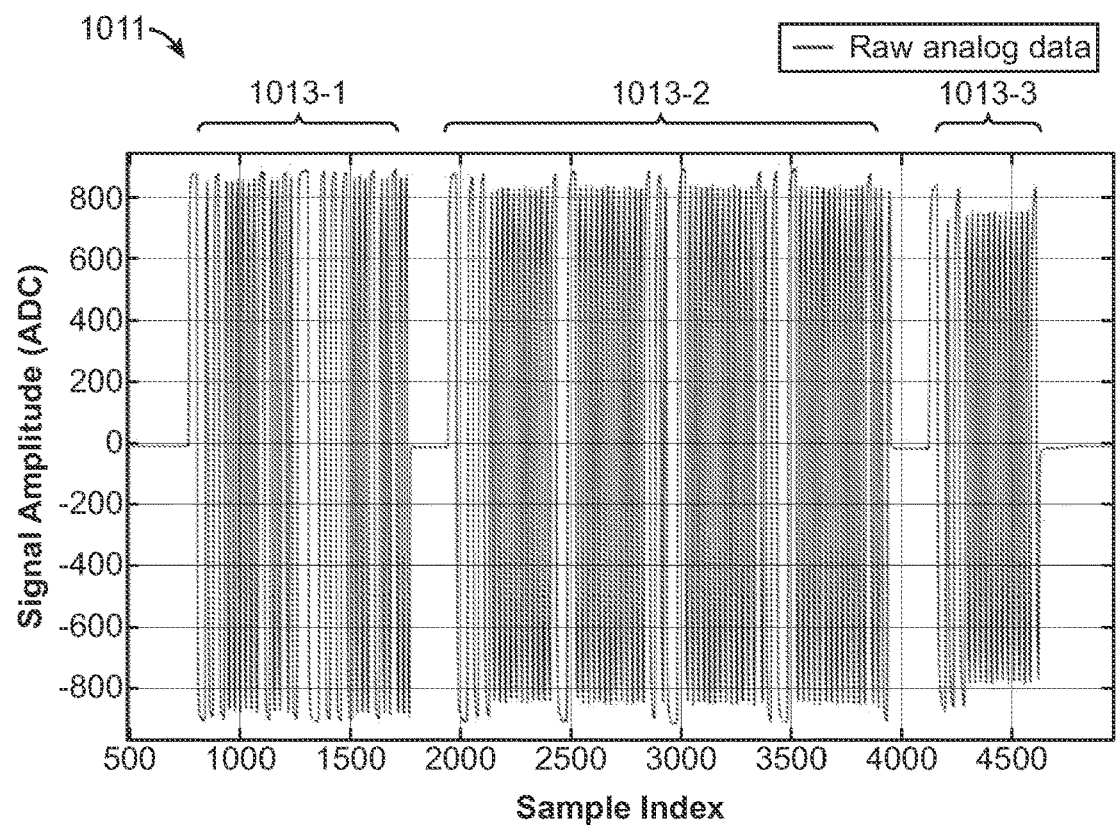
FIGS. 12(*a*) and 12(*b*) are graphical representations which together illustrate how the intrusion detection device in FIG. 7 extracts metadata from a digital waveform to identify the declared, or reported, source identifier for each of a series of messages.
Figure 12B:
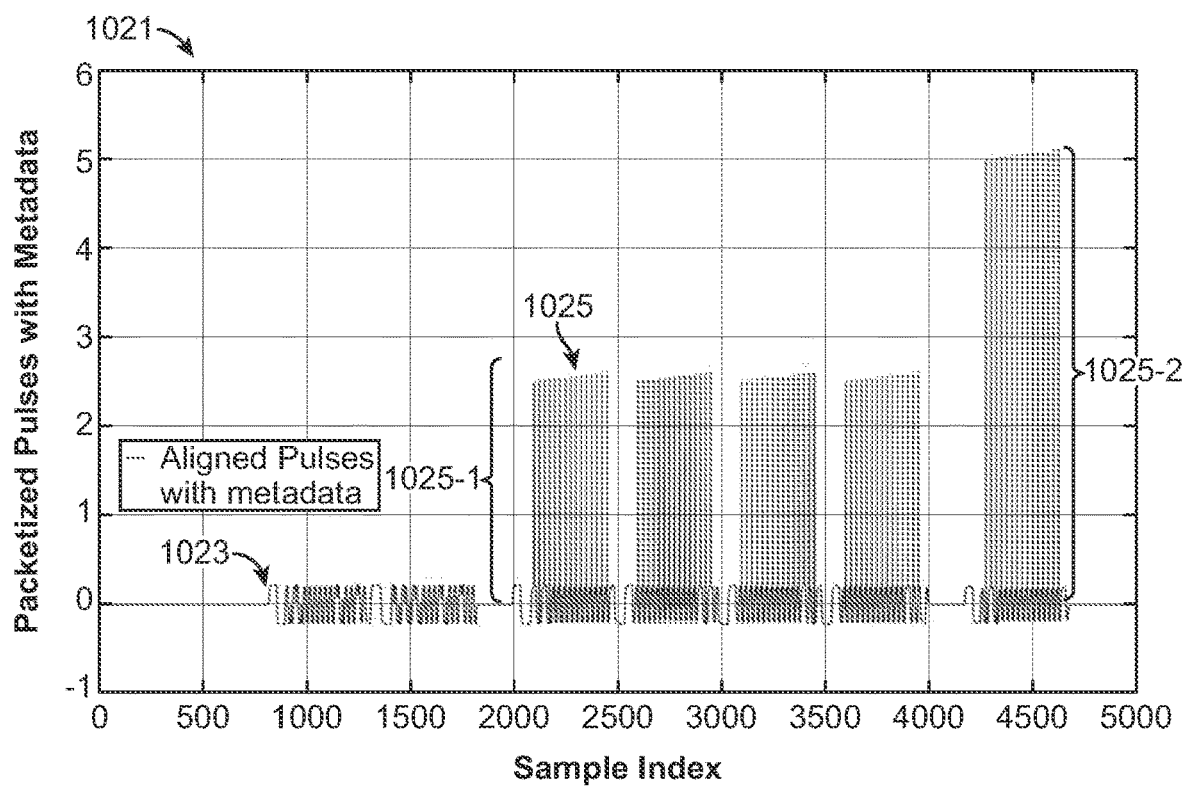

Specifically, in FIG. 12(*a*), the communication data, previously identified as bus activity and synchronized for processing, is represented as digital waveform 1011, which includes three separate messages 1013-1, 1013-2 and 1013-3. In FIG. 12(*b*), a digital waveform 1021 is provided which represents the bus data after preprocessing by IDD 521. Namely, waveform 1021 includes both (i) a sequence of data pulses 1023 which together represent the pulse content as tri-bit signals and (ii) certain metadata 1025 associated with each pulse. In the present example, metadata 1025 appears as a series of spikes, the height of which indicates the reported source ID and pulse index.

In particular, the portion of waveform 1023 representing primary message 1013-1 includes metadata in the absence of any spike height, thereby indicating that the reported source ID for message 1013-1 is node 00. Similarly, the portion of waveform 1023 representing secondary message 1013-2 includes metadata with a spike height 1025-1, thereby indicating that the reported source ID for message 1013-2 is node 10. Lastly, the portion of waveform 1023 representing tertiary message 1013-3 includes metadata with a spike height of 1025-2, thereby indicating that the reported source ID for message 1013-3 is node 20.

Figure 13A:
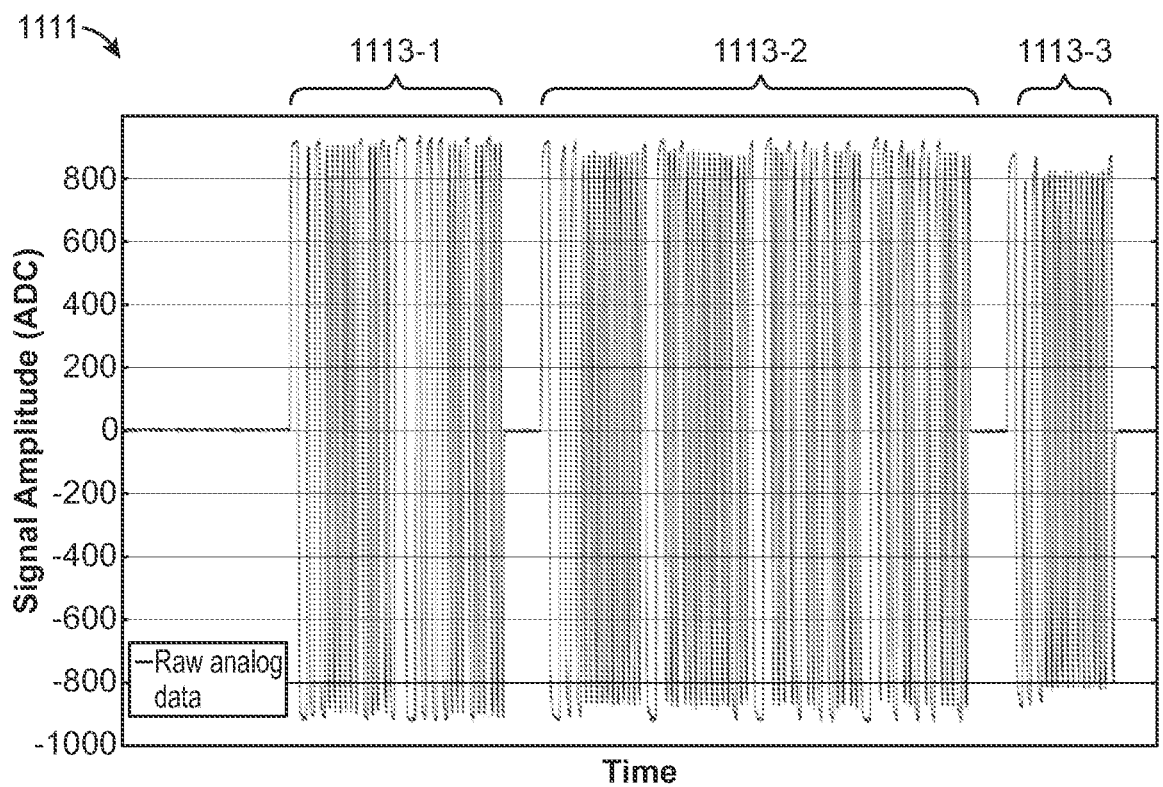
FIGS. 13(*a*)-(*c*) are graphical representations which together illustrate how the intrusion detection device in FIG. 7 authenticates data transmitted on the network bus when the data is in the absence of a spoofed message.
Figure 13B:
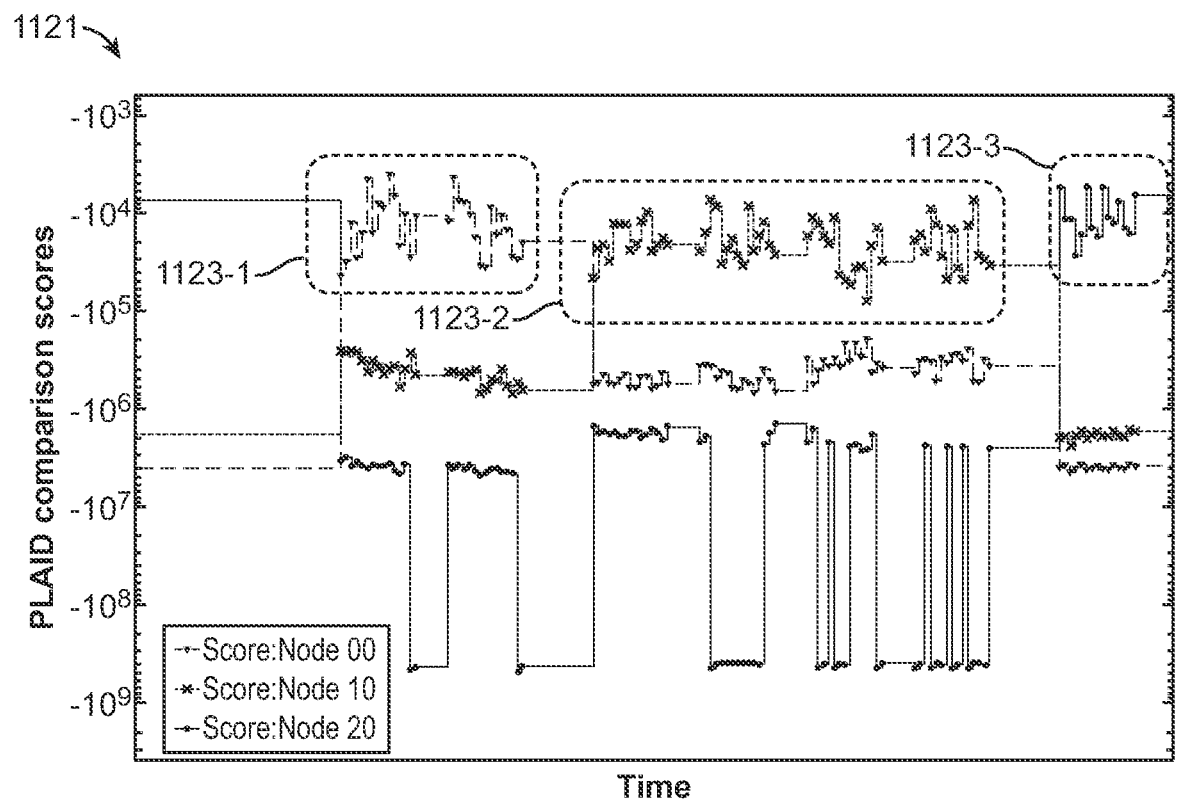
Figure 13C:
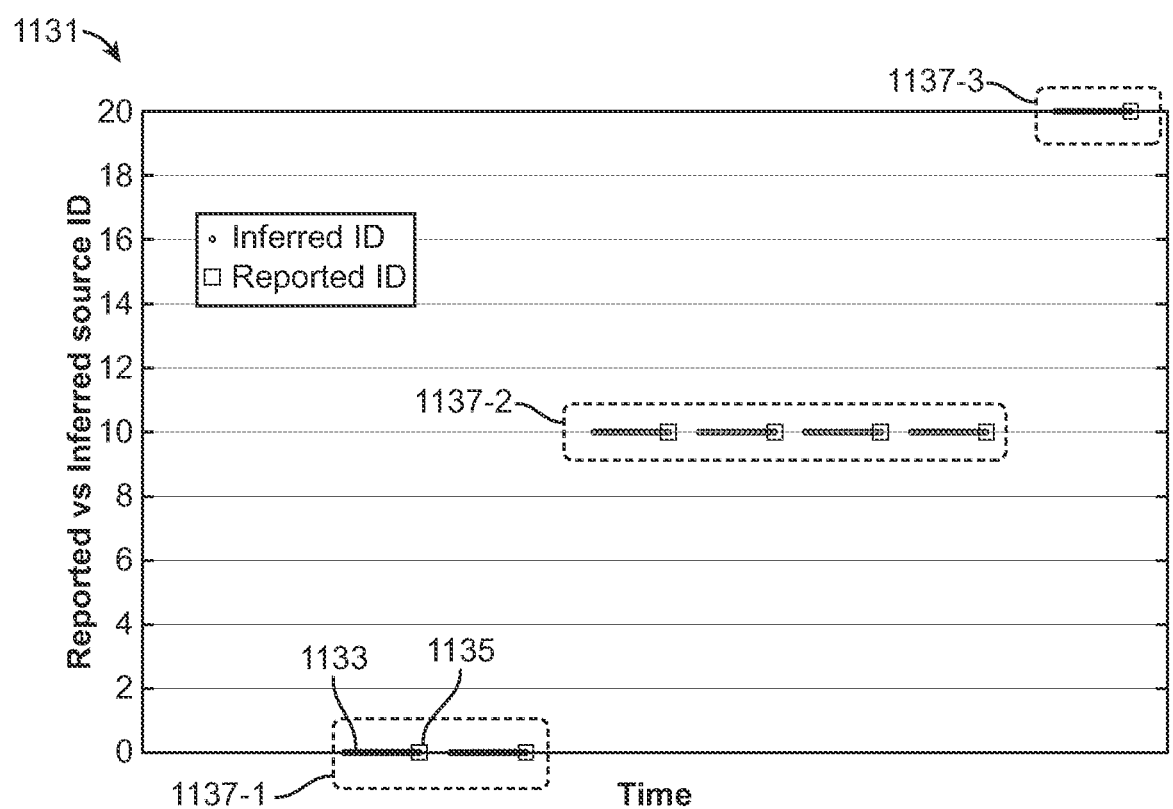

Referring now to FIGS. 13(*a*)-(*c*), there is shown a series of graphical representations which are useful in illustrating how test system 511 evaluates communication data which is in the absence of any spoofed messages. Specifically, in FIG. 13(*a*), the communication data, previously synchronized and preprocessed for authentication analysis, is represented as digital waveform 1111, which includes three separate messages 1113-1, 1113-2 and 1113-3.

In FIG. 13(*b*), a probabilistic modeling score is afforded to each pulse using learned templates 611 to create a comparison graph 1121. In other words, IDD 521 compares the signal characteristics of each measured tri-bit pulse against the learned templates 611. In this manner, a probability score can be afforded for each node by comparing the learned tri-bit template 611 for that node against the characteristics of the measured tri-bit pulse, wherein the greater the comparison score, the more likely the node can be inferred as the message source.

For instance, in connection with primary message 1113-1, each of the group of pulses with the highest probability scores, represented collectively as group 1123-1, correlates to node 00, thereby enabling IDD 521 to infer that node 00 (i.e. device BC) was the source of primary message 1113-1. Similarly, in connection with secondary message 1113-2, each of the group of pulses with the highest probability scores, represented collectively as group 1123-2, correlates to node 10, thereby enabling IDD 521 to infer that node 10 (i.e. device TX) was the source of secondary message 1113-2. Lastly, in connection with tertiary message 1113-3, each of the group of pulses with the highest probability scores, represented collectively as group 1123-3, correlates to node 20, thereby enabling IDD 521 to infer that node 20 (i.e. device RX) was the source of tertiary message 1113-3.

In FIG. 13(*c*), the inferred source ID for each pulse, which was determined through the comparative analysis engaged in FIG. 13(*b*), is then plotted relative to the reported, or declared, source ID for each word to yield a message authentication graph 1131. Therefore, by comparing the inferred source ID for each word against its corresponding declared source ID, the authenticity of each message can be evaluated on a word-by-word basis.

In the present illustration, the inferred source ID for each pulse is represented as a small dot, or circle, which collectively form a line 1133 for each word. At the same time, the reported source ID for each word is plotted on graph 1131 as a square 1135. Accordingly, congruity between line 1133 and square 1135 for each word in a designated message denotes that the message is authentic.

For instance, as seen within window 1137-1, the first two words display congruity between the inferred source ID and the reported source ID, thereby denoting, or supporting, message 1113-1 as authentic. Similarly, as seen within window 1137-2, the next four words display congruity between the inferred source ID and the reported source ID, thereby denoting message 1113-2 as authentic. Finally, as seen within window 1137-3, the last word displays congruity between the inferred source ID and the reported source ID, thereby denoting message 1113-3 as authentic.

Figure 14A:
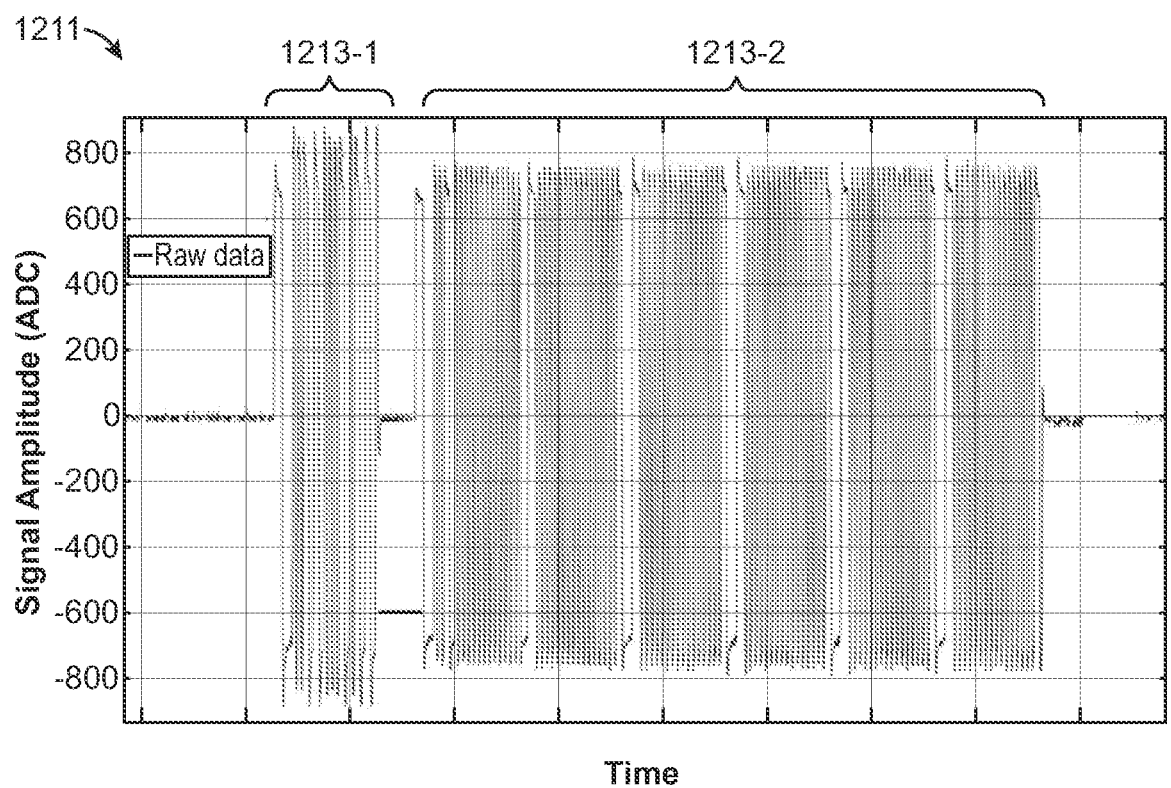
FIGS. 14(*a*)-(*c*) are graphical representations which together illustrate how the intrusion detection device in FIG. 7 authenticates data transmitted on the network bus when the data includes a spoofed message.

Referring now to FIGS. 14(*a*)-(*c*), there is shown a series of graphical representations which are useful in illustrating how test system 511 evaluates communication data which includes spoofed messages. Specifically, in FIG. 14(a), the communication data, previously synchronized and preprocessed for authentication analysis, is represented as digital waveform 1211, which includes two separate messages 1213-1 and 1213-2.

Figure 14B:
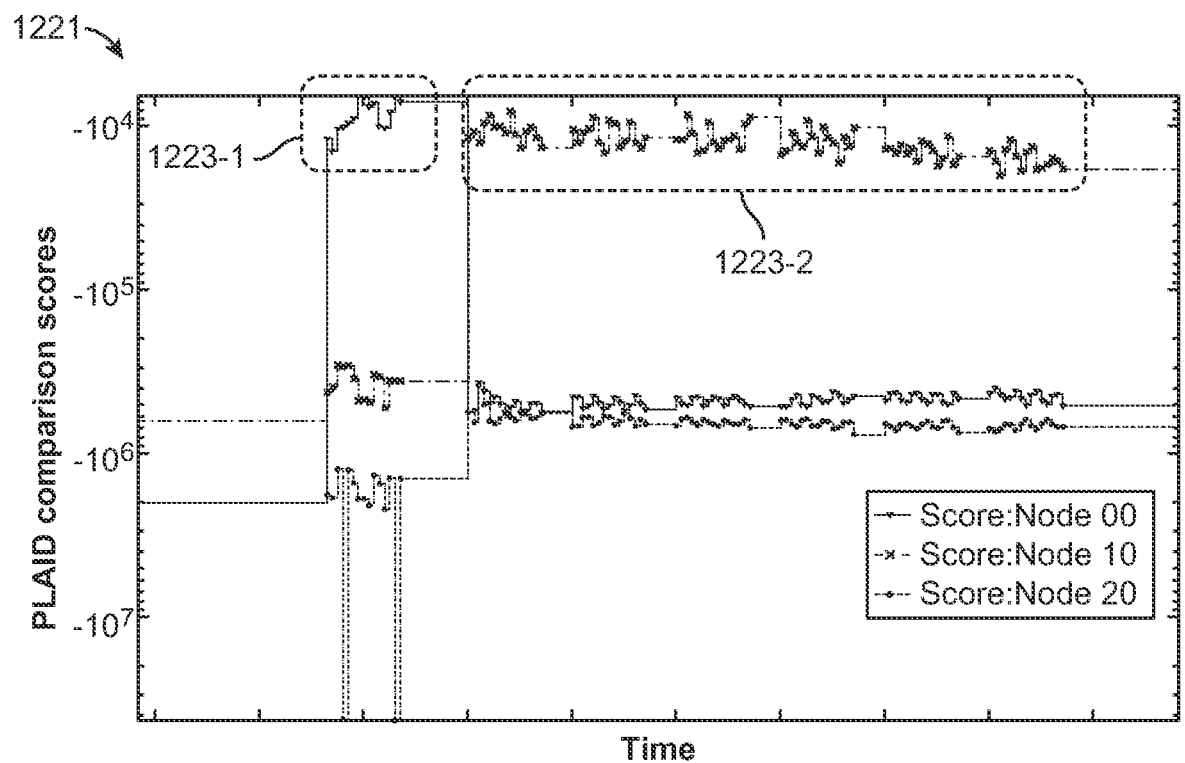

In FIG. 14(b), a probabilistic modeling score is afforded to each pulse using learned templates 611 to create a comparison graph 1221. In other words, IDD 521 compares the signal characteristics of each measured tri-bit pulse against the learned templates 611. In this manner, a probability score can be afforded for each node by comparing the learned tri-bit template 611 for that node against the characteristics of the measured tri-bit pulse, wherein the greater the comparison score, the more likely the node can be inferred as the message source.

For instance, in connection with primary message 1213-1, each of the group of pulses with the highest comparison scores, represented collectively as group 1223-1, correlates to node 00, thereby enabling IDD 521 to infer that node 00 (i.e. device BC) was the source of primary message 1213-1. Similarly, in connection with secondary message 1213-2, each of the group of pulses with the highest comparison scores, represented collectively as group 1223-2, correlates to node 10, thereby enabling IDD 521 to infer that node 10 (i.e. device TX) was the source of secondary message 1213-2.

As referenced briefly above, the present invention is not limited to any particular probabilistic modeling algorithm to yield comparison graph 1221. For instance, an inverse of the probabilistic modeling algorithm that was utilized to yield comparison graph 1221 could be implemented without departing from the spirit of the present invention. As a result, comparison graph 1221 would display the calculated difference, rather than the similarity, between the signal characteristics of each measured tri-bit pulse against the learned templates 611. As a result, the lower the comparison score, the more likely that the node associated with that score can be inferred as the message source.

Figure 14C:
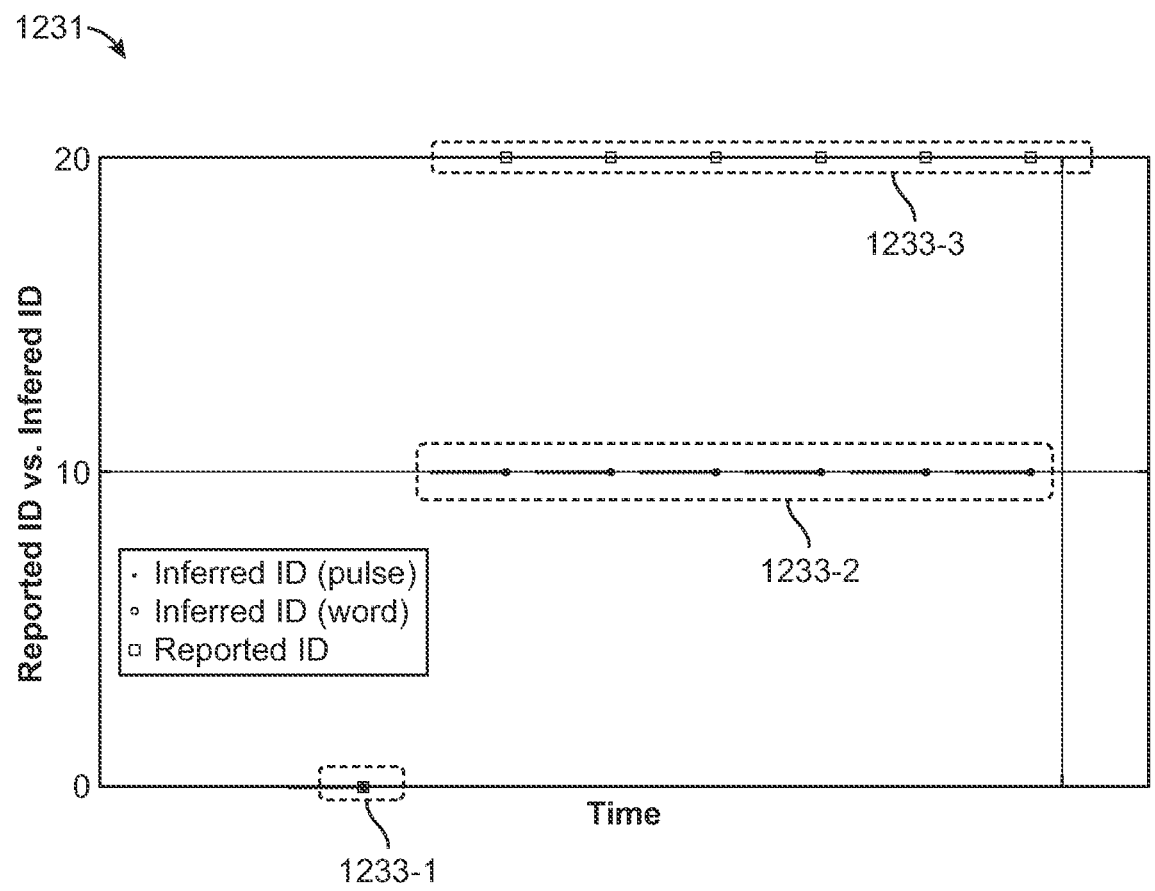

As seen in FIG. 14(c), the inferred source ID for each pulse, which was determined through the comparative analysis engaged in FIG. 14(b), is then plotted relative to the reported, or declared, source ID for each word to yield a message authentication graph 1231. Therefore, by comparing the inferred source ID for each word against its corresponding declared source ID, the authenticity of each message can be evaluated on a word-by-word basis.

For instance, as seen within window 1233-1, the first word displays congruity between the inferred source ID and the reported source ID, thereby denoting, or supporting, single-word message 1213-1 as authentic.

However, as seen within window 1233-2, the final six words are inferred as having a source ID correlating to node 10 (i.e. device TX). By contrast, the final six words are reported as having a declared source ID correlating to node 20 (i.e. device RX). This lack of congruity between the inferred source ID and the reported source ID, thereby indicates to IDD 521 the presence of a spoofing event. Namely, in connection with secondary message 1213-2, node 10 (i.e. device TX) is spoofing as node 20 (i.e. device RX). Because the presence of a spoofed message may indicate a deliberate attempt to infect system 511 (e.g. for unscrupulous reasons), IDD 521 is designed to initiate an appropriate response, such as the suppression of secondary message 1213-2.

The invention described in detail above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method for authenticating the source of a message transmitted on a communication network, the communication network comprising a flat network bus to which a plurality of nodes is coupled, each of the plurality of nodes being assigned a logical source identifier, the method comprising the steps of:
   (a) calculating an inferred source identifier for the message by analyzing physical characteristics of the transmitted message;
   (b) extracting a declared source identifier from the transmitted message; and
   (c) comparing the inferred source identifier against the declared source identifier to determine whether the message is authentic; and
   wherein the inferred source identifier calculating step comprises the steps of:
   (a) compiling at least one template which illustrates variances in the unique physical characteristics of a common signal component sent from a selection of the plurality of nodes when received at a fixed location on the communication network; and
   (b) after the compiling step, determining the inferred source identifier by comparing physical characteristics of the transmitted message against the at least one template.

2. The method as claimed in claim 1 wherein a discrepancy between the inferred source identifier and the declared source identifier indicates that the message is inauthentic.

3. The method as claimed in claim 1 wherein each of the at least one template represents a common signal pulse sent from a selection of the plurality of nodes.

4. The method as claimed in claim 1 wherein the common signal component sent from each
   of the selection of the plurality of nodes is received at the fixed location as a unique waveform.

5. The method as claimed in claim 4 wherein the unique waveforms for the common signal component received at the fixed location differ in at least one of peak-to-peak voltage, rise time, fall time, overshooting and under-shooting.

6. The method as claimed in claim 1 wherein the determining step is performed through probabilistic modeling.

7. The method as claimed in claim 2 wherein, upon detecting the message is inauthentic, initiating a response.

8. The method as claimed in claim 7 wherein the response is from the group consisting of suppression of the inauthentic message, suspension of data transmission on the network bus, and activation of an alert.

9. A communication network for authenticating the source of a message transmitted thereon, the communication network comprising:
   (a) a flat network bus;
   (b) a plurality of nodes coupled to the flat network bus, each of the plurality of nodes being assigned a logical source identifier; and
   (c) an intrusion detection device coupled to the flat network bus, wherein the intrusion detection device authenticates the source of the message by analyzing physical characteristics of the message;
   wherein the intrusion detection device is adapted to calculate an inferred source identifier for the message by analyzing physical characteristics of the transmitted message, extract a declared source identifier from the transmitted message, and compare the inferred source identifier against the declared source identifier to determine whether the message is authentic;

wherein the intrusion detection device indicates the message is inauthentic upon determining a discrepancy between the inferred source identifier and the declared source identifier;

wherein the intrusion detection device compiles at least one template which illustrates variances in the unique physical characteristics of a common signal component sent from a selection of the plurality of nodes when received by the intrusion detection device; and wherein the intrusion detection device determines the inferred source identifier by comparing physical characteristics of the transmitted message against the at least one template.

10. The communication network as claimed in claim 9 wherein each of the at least one template represents a common signal pulse sent from a selection of the plurality of nodes.

11. The communication network as claimed in claim 9 wherein the common signal component sent from each of the selection of the plurality of nodes is received by the intrusion detection device as a unique waveform.

12. The communication network as claimed in claim 11 wherein the unique waveforms for the common signal received by the intrusion detection device differ in at least one of peak-to-peak voltage, rise time, fall time, overshooting and under-shooting.

13. The communication network as claimed in claim 9 wherein the intrusion detection device comprises:
 (a) a connector adapted to be electronically coupled to the flat network bus; and
 (b) electronics in electrical communication with the connector, the electronics being programmed to authenticate the source of the message by analyzing physical characteristics of the message.

14. The communication network as claimed in claim 13 wherein the intrusion detection device is a modular network element coupled to one of the plurality of nodes.

15. The communication network as claimed in claim 13 wherein the intrusion detection device is a modular coupler connected inline to the flat network bus.

* * * * *